United States Patent
Fukunaga et al.

(10) Patent No.: US 12,243,999 B2
(45) Date of Patent: Mar. 4, 2025

(54) METHOD OF MANUFACTURING FORMED BODY FOR ELECTRODE

(71) Applicant: FUJIFILM CORPORATION, Tokyo (JP)

(72) Inventors: Akihito Fukunaga, Kanagawa (JP); Eijiro Iwase, Kanagawa (JP); Koji Tonohara, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/671,624

(22) Filed: Feb. 15, 2022

(65) Prior Publication Data

US 2022/0173371 A1  Jun. 2, 2022

Related U.S. Application Data

(63) Continuation of application No. PCT/JP2020/029538, filed on Jul. 31, 2020.

(30) Foreign Application Priority Data

Aug. 19, 2019 (JP) ................... 2019-149871

(51) Int. Cl.
*H01M 4/04* (2006.01)
*H01M 4/139* (2010.01)

(52) U.S. Cl.
CPC ....... *H01M 4/0435* (2013.01); *H01M 4/0404* (2013.01); *H01M 4/139* (2013.01)

(58) Field of Classification Search
CPC ............................ H01M 4/035; H01M 4/0471
See application file for complete search history.

(56) References Cited

U.S. PATENT DOCUMENTS

| | | | |
|---|---|---|---|
| 2016/0181651 A1 | 6/2016 | Tanihara et al. | |
| 2017/0256781 A1* | 9/2017 | Suzuki | H01M 4/139 |
| 2018/0006292 A1* | 1/2018 | Nakano | H01M 4/1391 |

(Continued)

FOREIGN PATENT DOCUMENTS

| | | |
|---|---|---|
| CN | 106804115 A | 6/2017 |
| CN | 109690834 A | 4/2019 |
| JP | 2007-227666 A | 9/2007 |

(Continued)

OTHER PUBLICATIONS

Machine translation of document N.*

(Continued)

*Primary Examiner* — Austin Murata
(74) *Attorney, Agent, or Firm* — SOLARIS Intellectual Property Group, PLLC

(57) ABSTRACT

The present disclosure provides a method of manufacturing a formed body for an electrode including: a step of preparing an electrode material containing an electrode active material; a step of supplying the electrode material onto the support; and a step of pressurizing the electrode material on the support by sandwiching the support and the electrode material between a first roll that is brought into contact with the electrode material and a second roll that is brought into contact with the support, in which a temperature T1 of the first roll and a temperature T2 of the second roll satisfy a relationship T1>T2.

12 Claims, 1 Drawing Sheet

(56) References Cited

U.S. PATENT DOCUMENTS

2019/0207253 A1      7/2019   Makino et al.
2020/0313229 A1* 10/2020   Haga ................. H01M 10/0525

FOREIGN PATENT DOCUMENTS

| | | |
|---|---|---|
| JP | 2014-102992 A | 6/2014 |
| JP | 2016-46226 A | 4/2016 |
| JP | 2016-62654 A | 4/2016 |
| JP | 2016-119207 A | 6/2016 |
| JP | 2016-164865 A | 9/2016 |
| JP | 2017-073267 A | 4/2017 |
| JP | 6211426 B2 | 10/2017 |
| JP | 2017-199671 A | 11/2017 |
| KR | 10-2016-0087251 A | 7/2016 |
| KR | 2019055726 * | 5/2019 |

OTHER PUBLICATIONS

International Search Report issued in International Application No. PCT/JP2020/029538 on Oct. 20, 2020.
Written Opinion of the ISA issued in International Application No. PCT/JP2020/029538 on Oct. 20, 2020.
English language translation of the following: Office action dated Feb. 14, 2023 from the JPO in a Japanese patent application No. 2021-540705 corresponding to the instant patent application.
English language translation of the following: Office action dated Jul. 18, 2023 from the JPO in a Japanese patent application No. 2021-540705 corresponding to the instant patent application.
English language translation of the following: Office action dated Nov. 30, 2023 from the SIPO in a Chinese patent application No. 202080057697.X corresponding to the instant patent application. This office action translation is submitted now in order to supplement the understanding of the cited references which are being disclosed in the instant Information Disclosure Statement.

* cited by examiner

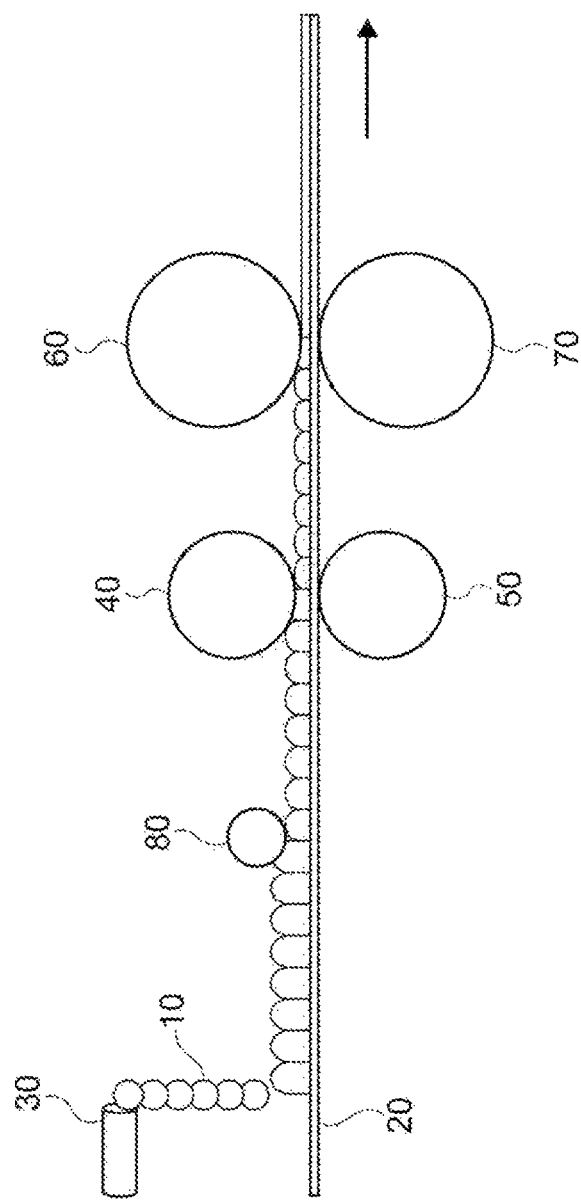

METHOD OF MANUFACTURING FORMED BODY FOR ELECTRODE

CROSS-REFERENCE TO RELATED APPLICATIONS

This application is a Continuation of International Application No. PCT/JP2020/029538, filed Jul. 31, 2020, which claims priority from Japanese Patent Application No. 2019-149871, filed Aug. 19, 2019. Each of the above applications is hereby expressly incorporated by reference, in its entirety, into the present application.

BACKGROUND OF THE INVENTION

1. Field of the Invention

The present disclosure relates to a method of manufacturing a formed body for an electrode.

2. Description of the Related Art

An electrolytic solution is usually used as an electrolyte contained in a battery such as a lithium ion battery. In recent years, from the viewpoint of safety (for example, prevention of liquid leakage), the development of an all-solid state battery that replaces an electrolytic solution with a solid electrolyte has been considered.

In a method of manufacturing an electrode that is applied to the battery described above, it is necessary to increase the density of an electrode material containing an active material in order to increase the capacity of the battery. For example, JP2016-62654A discloses a method of manufacturing an electrode for a lithium ion secondary battery including: a composite particle supply step of supplying composite particles containing an active material and a binder onto a sheet-shaped collector; and a rolling step of rolling the composite particles supplied onto the collector with a roll to form an active material layer, in which the rolling step includes a first rolling step including first rolling with the roll and a second rolling step that is performed after the first rolling step.

As a method of pressurizing an electrode material containing an active material, for example, a method of pressurizing an electrode material using a pair of rolls is used (see, for example, JP2016-62654A and JP6211426B).

SUMMARY OF THE INVENTION

In the method of manufacturing an electrode, for example, an electrode material on a support may be pressurized under given heating conditions in order to increase the density of the electrode material. However, in a case in which the heating temperature is increased, the support may be deformed. The deformation of the support may lead to a non-uniform mass distribution of the electrode material placed on the support. For example, according to the methods described in JP2016-62654A and JP6211426B, it is thought that although the electrode material may be formed at a high density, it is difficult to suppress the deformation of the support. In contrast, in a case in which the heating temperature is reduced, the electrode material cannot be formed at a high density, and the adhesiveness between the electrode material and the support may be reduced.

The present disclosure is accomplished in view of the above circumstances.

An object of an embodiment of the present disclosure is to provide a method of manufacturing a formed body for an electrode, which enables the manufacture of a formed body for an electrode that has excellent uniformity of mass distribution and adhesiveness between an electrode material and a support.

The present disclosure includes the following aspects.

<1> A method of manufacturing a formed body for an electrode including: a step of preparing an electrode material containing an electrode active material; a step of supplying the electrode material onto a support; and a step of pressurizing the electrode material on the support by sandwiching the support and the electrode material between a first roll that is brought into contact with the electrode material and a second roll that is brought into contact with the support, in which a temperature T1 of the first roll and a temperature T2 of the second roll satisfy a relationship T1>T2.

<2> The method of manufacturing a formed body for an electrode according to <1>, in which a pressure P1 is 10 MPa to 1 GPa in the step of pressurizing the electrode material on the support by sandwiching the support and the electrode material between the first roll and the second roll.

<3> The method of manufacturing a formed body for an electrode according to <1> or <2>, in which an absolute value of a difference between the temperature T1 and the temperature T2 is from 10° C. or higher.

<4>× The method of manufacturing a formed body for an electrode according to any one of <1> to <3>, in which the temperature T1 is from 40° C. to 65° C.

<5> The method of manufacturing a formed body for an electrode according to any one of <1> to <4>, in which the temperature T2 is from 0° C. to 30° C.

<6> The method of manufacturing a formed body for an electrode according to any one of <1> to <5>, further including: a step of pressurizing the electrode material on the support by sandwiching the support and the electrode material between a third roll that is brought into contact with the electrode material and a fourth roll that is brought into contact with the support after the step of pressurizing the electrode material on the support by sandwiching the support and the electrode material between the first roll and the second roll.

<7> The method of manufacturing a formed body for an electrode according to <6>, in which a temperature T3 of the third roll and a temperature T4 of the fourth roll satisfy a relationship T3>T4.

<8> The method of manufacturing a formed body for an electrode according to <7>, in which an absolute value of a difference between the temperature T3 and the temperature T4 is 30° C. or higher.

<9> The method of manufacturing a formed body for an electrode according to <7> or <8>, in which the temperature T3 is from 70° C. to 130° C.

<10> The method of manufacturing a formed body for an electrode according to any one of <7> to <9>, in which the temperature T4 is from 0° C. to 30° C.

<11> The method of manufacturing a formed body for an electrode according to any one of <7> to <10>, in which the temperature T1 and the temperature T3 satisfy a relationship T1<T3.

<12> The method of manufacturing a formed body for an electrode according to any one of <6> to <11>, in which a pressure P2 is 20 MPa to 1 GPa in the step of pressurizing the electrode material on the support by sandwiching the support and the electrode material between the third roll and the fourth roll.

<13> The method of manufacturing a formed body for an electrode according to any one of <6> to <12>, in which a ratio of a pressure P2 in the step of pressurizing the electrode material on the support by sandwiching the support and the electrode material between the third roll and the fourth roll to a pressure P1 in the step of pressurizing the electrode material on the support by sandwiching the support and the electrode material between the first roll and the second roll is 2 or more.

<14> The method of manufacturing a formed body for an electrode according to any one of <1> to <13>, in which a coefficient of linear expansion of the support is from $20 \times 10^{-6}/°$ C. to $180 \times 10^{-6}/°$ C.

According to an embodiment of the present disclosure, it is possible to provide a method of manufacturing a formed body for an electrode, in which a formed body for an electrode that is excellent in uniformity of a mass distribution and in adhesiveness between an electrode material and a support.

BRIEF DESCRIPTION OF THE DRAWINGS

FIG. 1 is a schematic diagram showing an example of a method of manufacturing a formed body for an electrode according to the present disclosure.

DESCRIPTION OF THE PREFERRED EMBODIMENTS

Hereinafter, embodiments of the present disclosure will be described with reference to the drawings. The present disclosure is not limited to the following embodiments, and may be implemented with appropriate changes within the scope of the object of the present disclosure. The dimensional ratios in the drawings do not necessarily represent the actual dimensional ratio.

In the present disclosure, a numerical range expressed using "to" means a range including numerical values before and after "to" as a lower limit and an upper limit. In numerical ranges described in a stepwise manner in the present disclosure, an upper limit or a lower limit described in a certain numerical range may be substituted with an upper limit or a lower limit of another numerical range described in a stepwise manner. Furthermore, in a numerical range described in the present disclosure, an upper limit or a lower limit described in a certain numerical range may be substituted with a value shown in an example.

In the present disclosure, the term "step" includes not only an independent step but also cases where it cannot be clearly distinguished from other steps, so long as the desired effect of the step can be achieved.

In the present disclosure, "(meth)acrylic" means acrylic and/or methacrylic.

In the present disclosure, regarding the amount of each component in a composition, in a case where there are a plurality of substances corresponding to the component in the composition, the amount means a total amount of the plurality of substances present in the composition, unless otherwise specified.

In the present disclosure, "mass %" and "wt %" are synonymous, and "parts by mass" and "parts by weight" are synonymous.

In the present disclosure, a combination of two or more preferable aspects is a more preferable aspect.

In the present disclosure, the "solid content" means a component which does not disappear by volatilization or evaporation in a case where a drying treatment is performed on 1 g of a sample at 200° C. for 6 hours under a nitrogen atmosphere.

In the present disclosure, the ordinal numbers (for example, "first" and "second") are terms that are used to distinguish the constituent elements, and do not limit the number of the constituent elements and the superiority or inferiority of the constituent elements.

<Method of Manufacturing Formed Body for Electrode>

A method of manufacturing a formed body for an electrode according to the present disclosure includes a step of preparing an electrode material containing an electrode active material (hereinafter, may be referred to as "preparation step"), a step of supplying the electrode material onto a support (hereinafter, may be referred to as "supply step"), and a step of pressurizing the electrode material on the support by sandwiching the support and the electrode material between a first roll that is brought into contact with the electrode material and a second roll that is brought into contact with the support (hereinafter, may be referred to as "first pressurizing step"), and a temperature T1 of the first roll and a temperature T2 of the second roll satisfy a relationship T1>T2.

In a case where the method of manufacturing a formed body for an electrode according to the present disclosure includes the above steps, a formed body for an electrode that is excellent in uniformity of a mass distribution and in adhesiveness between the electrode material and the support can be manufactured. The reason why the method of manufacturing a formed body for an electrode according to the present disclosure produces the above effect is presumed as follows. As described above, in the method of pressurizing the electrode material on the support under heating conditions, it is difficult to achieve both the uniformity of a mass distribution and the adhesiveness between the electrode material and the support.

Meanwhile, in a case where the method of manufacturing a formed body for an electrode according to the present disclosure includes the preparation step, the supply step, and the first pressurizing step, and a temperature T1 of the first roll and a temperature T2 of the second roll satisfy a relationship T1>T2, it is possible to sufficiently pressurize the electrode material on the support while suppressing the deformation of the support. Therefore, according to the method of manufacturing a formed body for an electrode according to the present disclosure, a formed body for an electrode that is excellent in uniformity of a mass distribution and in adhesiveness between the electrode material and the support can be manufactured.

«Preparation Step»

The method of manufacturing a formed body for an electrode according to the present disclosure includes a step of preparing an electrode material containing an electrode active material (preparation step). In the present disclosure, "preparing an electrode material" means that the electrode material is made to be in a usable state, and includes preparing the electrode material unless otherwise specified. That is, in the preparation step, a pre-prepared electrode material or a commercially available electrode material may be prepared, or an electrode material may be prepared.

[Electrode Material]

The electrode material contains an electrode active material. The electrode material may optionally contain a component other than the electrode active material. Hereinafter, components of the electrode material will be described.

(Electrode Active Material)

The electrode active material is a substance capable of inserting and releasing ions of metal elements belonging to Group 1 or 2 in the periodic table. Examples of the electrode active material include positive electrode active materials and negative electrode active materials.

—Positive Electrode Active Material—

The positive electrode active material is not limited, and known active materials used for a positive electrode can be used. The positive electrode active material is preferably a positive electrode active material capable of reversibly inserting and releasing lithium ions.

Examples of the positive electrode active material include transition metal oxides and elements (for example, sulfur) that can be combined with lithium. Among the above examples, the positive electrode active material is preferably a transition metal oxide.

The transition metal oxide is preferably a transition metal oxide containing at least one transition metal element (hereinafter, referred to as "element Ma") selected from the group consisting of cobalt (Co), nickel (Ni), iron (Fe), manganese (Mn), copper (Cu), and vanadium (V).

In a case where the transition metal oxide contains Li and an element Ma, a molar ratio of Li to the element Ma (substance amount of Li/substance amount of element Ma) is preferably 0.3 to 2.2. In the present disclosure, the "substance amount of element Ma" refers to a total substance amount of all elements corresponding to the element Ma.

In addition, the transition metal oxide may contain at least one transition metal element (hereinafter, referred to as "element Mb") selected from the group consisting of Group 1 elements other than lithium, Group 2 elements, aluminum (Al), gallium (Ga), indium (In), germanium (Ge), tin (Sn), lead (Pb), antimony (Sb), bismuth (Bi), silicon (Si), phosphorus (P), and boron (B). The content of the element Mb (that is, a total content of all elements corresponding to the element Mb) is preferably 0 mol % to 30 mol % with respect to the substance amount of the element Ma.

Examples of the transition metal oxide include transition metal oxides having a bedded salt-type structure, transition metal oxides having a spinel-type structure, lithium-containing transition metal phosphate compounds, lithium-containing transition metal halogenated phosphate compounds, and lithium-containing transition metal silicate compounds.

Examples of the transition metal oxides having a bedded salt-type structure include $LiCoO_2$ (lithium cobalt oxide [LCO]), $LiNi_2O_2$ (lithium nickel oxide), $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickel oxide).

Examples of the transition metal oxides having a spinel-type structure include $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphate compounds include olivine-type iron phosphate salts (for example, $LiFePO_4$ and $Li_3Fe_2(PO_4)_3$), iron pyrophosphate salts (for example, $LiFeP_2O_7$), cobalt phosphate salts (for example, $LiCoPO_4$), and monoclinic nasicon-type vanadium phosphate salts (for example, $Li_3V_2(PO_4)_3$ (lithium vanadium phosphate)).

Examples of the lithium-containing transition metal halogenated phosphate compounds include fluorinated iron phosphate salts (for example, $Li_2FePO_4F$), fluorinated manganese phosphate salts (for example, $Li_2MnPO_4F$), and fluorinated cobalt phosphate salts (for example, $Li_2CoPO_4F$).

Examples of the lithium-containing transition metal silicate compounds include $Li_2FeSiO_4$, $Li_2MnSiO_4$, and $Li_2CoSiO_4$.

The transition metal oxide is preferably a transition metal oxide having a bedded salt-type structure, and more preferably at least one compound selected from the group consisting of $LiCoO_2$ (lithium cobalt oxide [LCO]), $LiNi_{0.85}Co_{0.10}Al_{0.05}O_2$ (lithium nickel cobalt aluminum oxide [NCA]), and $LiNi_{1/3}Co_{1/3}Mn_{1/3}O_2$ (lithium nickel manganese cobalt oxide [NMC]).

The positive electrode active material may be a commercially available product or a synthetic product manufactured by a known method (for example, a firing method). For example, a positive electrode active material obtained by the firing method may be washed with water, an acidic aqueous solution, an alkaline aqueous solution, or an organic solvent.

The composition of the positive electrode active material is measured using inductive coupling plasma (ICP) emission spectrometric analysis.

The shape of the positive electrode active material is not limited, and is preferably a particulate shape from the viewpoint of handleability.

The volume average particle diameter of the positive electrode active material is not limited, and may be, for example, 0.1 µm to 50 µm. The volume average particle diameter of the positive electrode active material is preferably 0.3 µm to 40 µm, and more preferably 0.5 µm to 30 µm. In a case where the volume average particle diameter of the positive electrode active material is 0.3 µm or more, it is possible to easily form an aggregate of the electrode material, and it is possible to suppress the scattering of the electrode material during handling. In a case where the volume average particle diameter of the positive electrode active material is 40 µm or less, it is possible to easily adjust the thickness of a formed body for an electrode, and it is possible to suppress the generation of voids during the course of forming.

The volume average particle diameter of the positive electrode active material is measured by the following method. A dispersion liquid containing 0.1 mass % of the positive electrode active material is prepared by mixing the positive electrode active material with a solvent (for example, heptane, octane, toluene, or xylene). The dispersion liquid irradiated with 1 kHz of ultrasonic waves for 10 minutes is used as a measurement sample. Using a laser diffraction/scattering-type particle size distribution analyzer (for example, LA-920 manufactured by HORIBA, Ltd.), data is imported 50 times under the condition of a temperature of 25° C. to obtain a volume average particle diameter. A quartz cell is used as a measurement cell. The above measurement is performed using five samples, and an average of the measured values is defined as the volume average particle diameter of the positive electrode active material. For other detailed conditions, refer to "JIS Z 8828: 2013" as necessary.

Examples of the method of adjusting the particle diameter of the positive electrode active material include a method using a pulverizer or a classifier.

The electrode material may contain one kind of positive electrode active material alone, or two or more kinds of positive electrode active materials.

The content of the positive electrode active material is preferably 10 mass % to 95 mass %, more preferably 30 mass % to 90 mass %, even more preferably 50 mass % to 85 mass %, and particularly preferably 60 mass % to 80 mass % with respect to the total solid content mass of the electrode material.

—Negative Electrode Active Material—

The negative electrode active material is not limited, and known active materials used for a negative electrode can be used. The negative electrode active material is preferably a negative electrode active material capable of reversibly inserting and releasing lithium ions.

Examples of the negative electrode active material include carbonaceous materials, metal oxides (for example, tin oxide), silicon oxides, metal composite oxides, lithium single bodies, lithium alloys (for example, lithium aluminum alloy), and metals (for example, Sn, Si, and In) that can form an alloy with lithium. Among the above examples, the negative electrode active material is preferably a carbonaceous material or a lithium composite oxide from the viewpoint of reliability.

The carbonaceous material is substantially a material consisting of carbon. Examples of the carbonaceous material include carbonaceous materials obtained by firing petroleum pitch, carbon black (for example, acetylene black), graphite (for example, natural graphite and artificial graphite (for example, vapor-grown graphite)), hard carbon, or synthetic resins (for example, polyacrylonitrile (PAN) and furfuryl alcohol resin). Examples of the carbonaceous material also include carbon fibers (for example, polyacrylonitrile-based carbon fibers, cellulose-based carbon fibers, pitch-based carbon fibers, vapor-grown carbon fibers, dehydrated polyvinyl alcohol (PVA)-based carbon fibers, lignin carbon fibers, glassy carbon fibers, and activated carbon fibers). Examples of the graphite include mesophase microspheres, graphite whisker, and flat graphite. In the present disclosure, "flat" means a shape having two principal planes facing in opposite directions.

The metal composite oxide is preferably a metal composite oxide capable of storing and releasing lithium. The metal composite oxide capable of storing and releasing lithium preferably contains at least one element selected from the group consisting of titanium and lithium from the viewpoint of high current density charging and discharging characteristics.

The metal oxide and the metal composite oxide are particularly preferably amorphous oxides. Here, "amorphous" means a substance having a broad scattering band having a peak at 20° to 40° in terms of 2θ in an X-ray diffraction method using CuKα rays. The amorphous oxide may have a crystalline diffraction line. In the amorphous oxide, the highest intensity of the crystalline diffraction lines observed at 40° to 70° in terms of 2θ is preferably 100 times or less, and more preferably 5 times or less the intensity of a diffraction line having a peak in a broad scattering band observed at 20° to 40° in terms of 2θ. The amorphous oxide particularly preferably has no crystalline diffraction line.

The metal oxide and the metal composite oxide are also preferably chalcogenides. A chalcogenide is a reaction product of a metal element and an element of Group 16 in the periodic table.

Among the compound group consisting of amorphous oxides and chalcogenides, amorphous oxides and chalcogenides of metalloid elements are preferable, and oxides and chalcogenides containing at least one element selected from the group consisting of elements of Groups 13 to 15 in the periodic table, Al, Ga, Si, Sn, Ge, Pb, Sb, and Bi are more preferable.

Preferable examples of the amorphous oxides and chalcogenides include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Bi_2O_4$, $SnSiO_3$, GeS, SnS, $SnS_2$, PbS, $PbS_2$, $Sb_2S_3$, $Sb_2S_5$, and $SnSiS_3$. In addition, the above-described compound may be a composite oxide with lithium (for example, $Li_2SnO_2$).

The negative electrode active material preferably further contains titanium. The negative electrode active material containing titanium is preferably $Li_4Ti_5O_{12}$ (lithium titanate [LTO]) from the viewpoint that it has excellent high-speed charging and discharging characteristics since the volume thereof changes only to a small extent during the storing and release of lithium ions, and the life of the lithium ion secondary battery can be improved due to the suppression of deterioration of the electrode.

The negative electrode active material may be a commercially available product or a synthetic product manufactured by a known method (for example, a firing method). For example, a negative electrode active material obtained by the firing method may be washed using water, an acidic aqueous solution, an alkaline aqueous solution, or an organic solvent.

For example, CGB20 (Nippon Graphite Industries, Co., Ltd.) is available as the negative electrode active material.

The composition of the negative electrode active material is measured using inductive coupling plasma (ICP) emission spectrometric analysis.

The shape of the negative electrode active material is not limited, and is preferably a particulate shape from the viewpoint of easy handling and easy control of uniformity during mass production.

The volume average particle diameter of the negative electrode active material is preferably 0.1 μm to 60 μm, more preferably 0.3 μm to 50 μm, and particularly preferably 0.5 μm to 40 μm. In a case where the volume average particle diameter of the negative electrode active material is 0.1 μm or more, it is possible to easily form an aggregate of the electrode material, and it is possible to suppress the scattering of the electrode material during handling. In a case where the volume average particle diameter of the negative electrode active material is 60 μm or less, it is possible to easily adjust the thickness of a formed body for an electrode, and it is possible to suppress the generation of voids during the course of forming. The volume average particle diameter of the negative electrode active material is measured by a method according to the method of measuring the volume average particle diameter of the positive electrode active material.

Examples of the method of adjusting the particle diameter of the negative electrode active material include a method using a pulverizer or a classifier. In the above-described method, for example, a mortar, a ball mill, a sand mill, a vibrating ball mill, a satellite ball mill, a planetary ball mill, a swirling airflow-type jet mill, or a sieve is suitably used. In the pulverization of the negative electrode active material, wet pulverization using water or an organic solvent (for example, methanol) can also be optionally performed. The method of adjusting to a desired particle diameter is preferably classification. In the classification, for example, a sieve or a wind power classifier can be used. The classification may be performed in a dry manner or in a wet manner.

In a case where an amorphous oxide containing Sn, Si, or Ge is used as the negative electrode active material, preferable examples of the negative electrode active material that can be used in combination with the above-described amorphous oxide include carbon materials capable of storing and releasing lithium ions or a lithium metal, lithium, lithium alloys, and metals capable of being alloyed with lithium.

The electrode material may contain one kind of negative electrode active material alone, or two or more kinds of negative electrode active materials.

The content of the negative electrode active material is preferably 10 mass % to 80 mass %, more preferably 20 mass % to 80 mass %, even more preferably 30 mass % to 80 mass %, and particularly preferably 40 mass % to 75 mass % with respect to the total solid content mass of the electrode material.

The surfaces of the positive electrode active material and the negative electrode active material may be coated with a surface coating agent. Examples of the surface coating agent include metal oxides containing Ti, Nb, Ta, W, Zr, Si, or Li. Examples of the metal oxides include titanate spinels, tantalum-based oxides, niobium-based oxides, and lithium niobate-based compounds. Specific examples of the compounds include $Li_4Ti_5O_{12}$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, and $LiBO_2$.

(Inorganic Solid Electrolyte)

The electrode material preferably contains an inorganic solid electrolyte from the viewpoint of an improvement in battery performance (for example, discharge capacity and output characteristics). Here, the "solid electrolyte" means a solid-state electrolyte in which ions can move inside thereof.

Since the inorganic solid electrolyte is not an electrolyte containing an organic substance as a principal ion-conductive material, it is clearly differentiated from organic solid electrolytes (for example, polymer electrolytes represented by polyethylene oxide (PEO), and organic electrolyte salts represented by lithium bis(trifluoromethanesulfonyl)imide (LiTFSI)). In addition, since the inorganic solid electrolyte is solid at steady state, it is not dissociated or liberated into cations or anions. Therefore, the inorganic solid electrolyte is also clearly differentiated from inorganic electrolyte salts (for example, $LiPF_6$, $LiBF_4$, lithium bis(fluoroulfonyl)imide (LiFSI), and LiCl) that are dissociated or liberated into cations or anions in electrolytic solutions or polymers.

The inorganic solid electrolyte is not limited as long as it is an inorganic solid electrolyte having ion conductivity of a metal element belonging to Group 1 or 2 in the periodic table, and generally does not have electron conductivity.

In a case where a formed body for an electrode obtained by the method of manufacturing a formed body for an electrode according to the present disclosure is used for a lithium ion battery, the inorganic solid electrolyte preferably has lithium ion conductivity.

Examples of the inorganic solid electrolyte include sulfide-based inorganic solid electrolytes and oxide-based inorganic solid electrolytes. Among the above examples, the inorganic solid electrolyte is preferably a sulfide-based inorganic solid electrolyte from the viewpoint that a good interface can be formed between the active material and the inorganic solid electrolyte.

—Sulfide-Based Inorganic Solid Electrolyte—

The sulfide-based inorganic solid electrolyte preferably contains a sulfur atom (S), has ion conductivity of a metal element belonging to Group 1 or 2 in the periodic table, and has an electron-insulating property.

The sulfide-based inorganic solid electrolyte more preferably contains at least Li, S, and P, and has lithium ion conductivity. The sulfide-based inorganic solid electrolyte may optionally contain an element other than Li, S, and P.

Examples of the sulfide-based inorganic solid electrolyte include an inorganic solid electrolyte having a composition represented by Formula (A).

$$L_{a1}M_{b1}P_{c1}S_{d1}A_{e1} \qquad \text{Formula (A)}$$

In Formula (A), L represents at least one element selected from the group consisting of Li, Na, and K, and is preferably Li.

In Formula (A), M represents at least one element selected from the group consisting of B, Zn, Sn, Si, Cu, Ga, Sb, Al, and Ge, and is preferably B, Sn, Si, Al, or Ge, and more preferably Sn, Al, or Ge.

In Formula (A), A represents at least one element selected from the group consisting of I, Br, Cl, and F, and is preferably I or Br, and more preferably I.

In Formula (A), a1 represents 1 to 12, and is preferably 1 to 9, and more preferably 1.5 to 4.

In Formula (A), b1 represents 0 to 1, and is more preferably 0 to 0.5.

In Formula (A), c1 represents 1.

In Formula (A), d1 represents 2 to 12, and is preferably 3 to 7, and more preferably 3.25 to 4.5.

In Formula (A), e1 represents 0 to 5, and is preferably 0 to 3, and more preferably 0 to 1.

In Formula (A), it is preferable that b1 and e1 are 0, it is more preferable that b1 and e1 are 0, and a proportion of a1, c1, and d1 (that is, a1:c1:d1) is 1 to 9:1:3 to 7, and it is particularly preferable that b1 and e1 are 0, and a proportion of a1, c1, and d1 (that is, a1:c1:d1) is 1.5 to 4:1:3.25 to 4.5.

The compositional ratio of each element can be controlled by, for example, adjusting an amount of the raw material compound to be blended in the manufacturing of the sulfide-based inorganic solid electrolyte.

The sulfide-based inorganic solid electrolyte may be amorphous (glass) or crystallized (glass ceramics), or only partially crystallized. Examples of the sulfide-based inorganic solid electrolyte described above include Li—P—S-based glass containing Li, P, and S, and Li—P—S-based glass ceramics containing Li, P, and S. Among the above examples, the sulfide-based inorganic solid electrolyte is preferably Li—P—S-based glass.

The lithium ion conductivity of the sulfide-based inorganic solid electrolyte is preferably $1 \times 10^{-4}$ S/cm or more, and more preferably $1 \times 10^{-3}$ S/cm or more. The upper limit of the lithium ion conductivity of the sulfide-based inorganic solid electrolyte is not limited. The lithium ion conductivity of the sulfide-based inorganic solid electrolyte is, for example, substantially $1 \times 10^{-1}$ S/cm or less.

The sulfide-based inorganic solid electrolyte can be manufactured by, for example, (1) a reaction of lithium sulfide ($Li_2S$) and phosphorus sulfide (for example, diphosphorus pentasulfide ($P_2S_5$)), (2) a reaction of lithium sulfide and at least one of a phosphorus single body or a sulfur single body, or (3) a reaction of lithium sulfide, phosphorus sulfide (for example, diphosphorus pentasulfide ($P_2S_5$)), and at least one of a phosphorus single body or a sulfur single body.

The molar ratio of $Li_2S$ to $P_2S_5$ ($Li_2S:P_2S_5$) in the manufacturing of the Li—P—S-based glass and the Li—P—S-based glass ceramics is preferably 65:35 to 85:15, and more preferably 68:32 to 77:23. By setting the molar ratio of $Li_2S$ to $P_2S_5$ within the above range, lithium ion conductivity can be further increased.

Examples of the sulfide-based inorganic solid electrolyte include a compound formed of a raw material composition containing $Li_2S$ and a sulfide of an element of Groups 13 to 15. Examples of the raw material composition include $Li_2S$—$P_2S_5$, $Li_2S$—$LiI$—$P_2S_5$, $Li_2S$—$LiI$—$Li_2O$—$P_2S_5$, $Li_2S$—$LiBr$—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SnS$, $Li_2S$—$P_2S_5$—$Al_2S_3$, $Li_2S$—$GeS_2$, $Li_2S$—$GeS_2$—$ZnS$, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—$LiI$, $Li_2S$—$SiS_2$—$LiI$, $Li_2S$—$SiS_2$—$Li_4SiO_4$, $Li_2S$—$SiS_2$—$Li_3PO_4$, and $Li_{10}GeP_2Si_2$. Among the above examples, the raw material composition is preferably $Li_2S$—$P_2S_5$, $Li_2S$—$GeS_2$—$Ga_2S_3$, $Li_2S$—$SiS_2$—$P_2S_5$, $Li_2S$—$SiS_2$—$Li_4SiO_4$, $Li_2S$—$SiS_2$—$Li_3PO_4$, $Li_2S$—$LiI$—$Li_2O$—$P_2S_5$, $Li_2S$—$Li_2O$—$P_2S_5$, $Li_2S$—$Li_3PO_4$—$P_2S_5$, $Li_2S$—$GeS_2$—$P_2S_5$, or $Li_{10}GeP_2S_{12}$, and more preferably $Li_2S$—$P_2S_5$, $Li_{10}GeP_2S_{12}$, or $Li_2S$—$P_2S_5$—$SiS_2$ from the viewpoint of high lithium ion conductivity.

Examples of the method of manufacturing the sulfide-based inorganic solid electrolyte using the above-described raw material composition include an amorphization method.

Examples of the amorphization method include a mechanical milling method and a melting quenching method. Among the above examples, a mechanical milling method is preferable from the viewpoint that the treatment can be performed at normal temperature and the manufacturing process can be simplified.

—Oxide-Based Inorganic Solid Electrolyte—

The oxide-based inorganic solid electrolyte preferably contains an oxygen atom (0), has ion conductivity of a metal element belonging to Group 1 or Group 2 in the periodic table, and has an electron-insulating property.

The ion conductivity of the oxide-based inorganic solid electrolyte is preferably $1 \times 10^{-6}$ S/cm or more, more preferably $5 \times 10^{-6}$ S/cm or more, and particularly preferably $1 \times 10^{-5}$ S/cm or more. The upper limit of the ion conductivity of the oxide-based inorganic solid electrolyte is not limited. The ion conductivity of the oxide-based inorganic solid electrolyte is, for example, substantially $1 \times 10^{-1}$ S/cm or less.

Examples of the oxide-based inorganic solid electrolyte include the following compounds. However, the oxide-based inorganic solid electrolyte is not limited to the following compounds.

(1) $Li_{xa}La_{ya}TiO_3$ (hereinafter, referred to as "LLT". xa satisfies $0.3 \leq xa \leq 0.7$ and ya satisfies $0.3 \leq ya \leq 0.7$)

(2) $Li_{xb}La_{yb}Zr_{zb}M^{bb}{}_{mb}O_{nb}$ ($M^{bb}$ is at least one element selected from the group consisting of Al, Mg, Ca, Sr, V, Nb, Ta, Ti, Ge, In, and Sn. xb satisfies $5 \leq xb \leq 10$, yb satisfies $1 \leq yb \leq 4$, zb satisfies $1 \leq zb \leq 4$, mb satisfies $0 \leq mb \leq 2$, and nb satisfies $5 \leq nb \leq 20$)

(3) $Li_{xc}B_{yc}M^{cc}{}_{zc}O_{nc}$ ($M^{cc}$ is at least one element selected from the group consisting of C, S, Al, Si, Ga, Ge, In, and Sn. xc satisfies $0 \leq xc \leq 5$, yc satisfies $0 \leq yc \leq 1$, zc satisfies $0 \leq zc \leq 1$, and nc satisfies $0 \leq nc \leq 6$)

(4) $Li_{xd}(Al, Ga)_{yd}(Ti, Ge)_{zd}Si_{ad}P_{md}O_{nd}$ (xd satisfies $1 \leq xd \leq 3$, yd satisfies $0 \leq yd \leq 1$, zd satisfies $0 \leq zd \leq 2$, ad satisfies $0 \leq ad \leq 1$, md satisfies $1 \leq md \leq 7$, and nd satisfies $3 \leq nd \leq 13$)

(5) $Li_{(3-2xe)}M^{ee}{}_{xe}D^{ee}O$ (xe satisfies $0 \leq xe \leq 0.1$, $M^{ee}$ represents a divalent metal atom, and $D^{ee}$ represents a halogen atom or a combination of two or more halogen atoms)

(6) $Li_{xf}Si_{yf}O_{zf}$ (xf satisfies $1 \leq xf \leq 5$, yf satisfies $0 \leq yf \leq 3$, and zf satisfies $1 \leq zf \leq 10$)

(7) $Li_{xg}S_{yg}O_{zg}$ (xg satisfies $1 \leq xg \leq 3$, yg satisfies $0 \leq yg \leq 2$, and zg satisfies $1 \leq zg \leq 10$)

(8) $Li_3BO_3$ (9) $Li_3BO_3$—$Li_2SO_4$

(10) $Li_2O$—$B_2O_3$—$P_2O_5$

(11) $Li_2O$—$SiO_2$

(12) $Li_6BaLa_2Ta_2O_{12}$

(13) $Li_3PO_{(4-3/2w)}N_w$ (w satisfies $w < 1$)

(14) $Li_{3.5}Zn_{0.25}GeO_4$ having a lithium super ionic conductor (LISICON)-type crystal structure

(15) $La_{0.55}Li_{0.35}TiO_3$ having a perovskite-type crystal structure

(16) $LiTi_2P_3O_{12}$ having a natrium super ionic conductor (NASICON)-type crystal structure

(17) $Li_{1+xh+yh}(Al, Ga)_{xh}(Ti, Ge)_{2-xh}Si_{yh}P_{3-yh}O_{12}$ (xh satisfies $0 \leq xh \leq 1$ and yh satisfies $0 \leq yh \leq 1$)

(18) $Li_7La_3Zr_2O_{12}$ having a garnet-type crystal structure (hereinafter, referred to as "LLZ")

As the oxide-based inorganic solid electrolyte, phosphorus compounds containing Li, P, and O are also preferable. Examples of the phosphorus compounds containing Li, P, and O include lithium phosphate ($Li_3PO_4$), LiPON in which a part of oxygen of lithium phosphate is substituted with nitrogen, and LiPOD1 (D1 is at least one element selected from the group consisting of Ti, V, Cr, Mn, Fe, Co, Ni, Cu, Zr, Nb, Mo, Ru, Ag, Ta, W, Pt, and Au).

As the oxide-based inorganic solid electrolyte, $LiA^1ON$ ($A^1$ is at least one element selected from the group consisting of Si, B, Ge, Al, C, and Ga) is also preferable.

Among the above examples, the oxide-based inorganic solid electrolyte is preferably LLT, $Li_{xb}La_{yb}Zr_{zb}M^{bb}{}_{mb}O_{nb}$ ($M^{bb}$, xb, yb, zb, mb, and nb are as described above), LLZ, $Li_3BO_3$, $Li_3BO_3$—$Li_2SO_4$, or $Li_{xd}(Al, Ga)_{yd}(Ti, Ge)_{zd}Si_{ad}P_{md}O_{nd}$ (xd, yd, zd, ad, md, and nd are as described above), more preferably LLT, LLZ, LAGP ($Li_{1.5}Al_{0.5}Ge_{1.5}(PO_4)_3$), or LATP ($[Li_{1.4}Ti_2Si_{0.4}P_{2.6}O_{12}]$—$AlPO_4$), and particularly preferably LLZ.

The inorganic solid electrolyte preferably has a particulate shape.

The volume average particle diameter of the inorganic solid electrolyte is preferably 0.01 μm or more, and more preferably 0.1 μm or more. The volume average particle diameter of the inorganic solid electrolyte is preferably 100 μm or less, and more preferably 50 μm or less.

The volume average particle diameter of the inorganic solid electrolyte is measured by the following method. A dispersion liquid containing 1 mass % of the inorganic solid electrolyte is prepared by mixing the inorganic solid electrolyte with water (heptane in a case where the volume average particle diameter of a substance unstable to water is measured). The dispersion liquid irradiated with 1 kHz of ultrasonic waves for 10 minutes is used as a measurement sample. Using a laser diffraction/scattering-type particle size distribution analyzer (for example, LA-920 manufactured by HORIBA, Ltd.), data is imported 50 times under the condition of a temperature of 25° C. to obtain a volume average particle diameter. A quartz cell is used as a measurement cell. The above measurement is performed using five samples, and an average of the measured values is defined as the volume average particle diameter of the inorganic solid electrolyte. For other detailed conditions, refer to "JIS Z 8828: 2013" as necessary.

The electrode material may contain one kind of inorganic solid electrolyte alone, or two or more kinds of inorganic solid electrolytes.

In a case where the electrode material contains an inorganic solid electrolyte, the content of the inorganic solid electrolyte is preferably 1 mass % or more, more preferably 5 mass % or more, and particularly preferably 10 mass % or more with respect to the total solid content mass of the electrode material from the viewpoint of reduction of interface resistance and a battery characteristic maintaining effect (for example, improvement in cycle characteristics). From the same viewpoint, the content of the inorganic solid electrolyte is preferably 90 mass % or less, more preferably 70 mass % or less, and particularly preferably 50 mass % or less with respect to the total solid content mass of the electrode material.

(Binder)

The electrode material preferably contains a binder from the viewpoint of an improvement in adhesiveness between the electrode materials. The binder is not limited as long as it is an organic polymer, and known binders used as a binder in a positive electrode or a negative electrode of the battery material can be used. Examples of the binder include fluorine-containing resins, hydrocarbon-based thermoplastic resins, acrylic resins, and urethane resins.

Examples of the fluorine-containing resins include polytetrafluoroethylene (PTFE), polyvinylene difluoride (PVdF), and a copolymer of polyvinylene difluoride and hexafluoropropylene (PVdF-HFP).

Examples of the hydrocarbon-based thermoplastic resins include polyethylene, polypropylene, styrene-butadiene rubber (SBR), hydrogenated styrene-butadiene rubber (HSBR), butylene rubber, acrylonitrile-butadiene rubber, polybutadiene, and polyisoprene.

Examples of the acrylic resins include methyl poly(meth)acrylate, ethyl poly(meth)acrylate, isopropyl poly(meth)acrylate, isobutyl poly(meth)acrylate, butyl poly(meth)acrylate, hexyl poly(meth)acrylate, octyl poly(meth)acrylate, dodecyl poly(meth)acrylate, stearyl poly(meth)acrylate, 2-hydroxyethyl poly(meth)acrylate, poly(meth)acrylate, benzyl poly(meth)acrylate, glycidyl poly(meth)acrylate, dimethylaminopropyl poly(meth)acrylate, and copolymers of monomers forming the above resins.

Examples of the binder also include copolymers of vinyl-based monomers. Examples of the copolymers of vinyl-based monomers include a methyl (meth)acrylate-styrene copolymer, a methyl (meth)acrylate-acrylonitrile copolymer, and a butyl (meth)acrylate-acrylonitrile-styrene copolymer.

The weight-average molecular weight of the binder is preferably 10,000 or more, more preferably 20,000 or more, and particularly preferably 50,000 or more. The weight-average molecular weight of the binder is preferably 1,000,000 or less, more preferably 200,000 or less, and particularly preferably 100,000 or less.

The moisture concentration in the binder is preferably 100 ppm or less on a mass basis.

The metal concentration in the binder is preferably 100 ppm or less on a mass basis.

The electrode material may contain one kind of binder alone, or two or more kinds of binders.

In a case where the electrode material contains a binder, the content of the binder is preferably 0.01 mass % or more, more preferably 0.1 mass % or more, and particularly preferably 1 mass % or more with respect to the total solid content mass of the electrode material from the viewpoint of reduction of interface resistance and maintaining of the reduction. The content of the binder is preferably 10 mass % or less, more preferably 5 mass % or less, and particularly preferably 3 mass % or less with respect to the total solid content mass of the electrode material from the viewpoint of battery performance.

In a case where the electrode material contains an electrode active material, an inorganic solid electrolyte, and a binder, a ratio of the total mass of the active material and the inorganic solid electrolyte to the mass of the binder ([mass of active material+mass of inorganic solid electrolyte]/[mass of the binder]) is preferably 1,000 to 1, more preferably 500 to 2, and particularly preferably 100 to 10.

(Conductive Auxiliary Agent)

The electrode material preferably contains a conductive auxiliary agent from the viewpoint of an improvement in electron conductivity of the active material. The conductive auxiliary agent is not limited, and known conductive auxiliary agents can be used. In particular, in a case where the electrode material contains a positive electrode active material, the electrode material preferably contains a conductive auxiliary agent.

Examples of the conductive auxiliary agent include graphite (for example, natural graphite and artificial graphite), carbon black (for example, acetylene black, Ketjen black, and furnace black), amorphous carbon (for example, needle coke), carbon fibers (for example, vapor-grown carbon fibers and carbon nanotubes), other carbonaceous materials (for example, graphene and fullerene), metal powders (for example, a copper powder and a nickel powder), metal fibers (for example, copper fibers and nickel fibers), and conductive polymers (for example, polyaniline, polypyrrole, polythiophene, polyacetylene, and polyphenylene derivatives).

Among the above examples, the conductive auxiliary agent is preferably at least one conductive auxiliary agent selected from the group consisting of carbon fibers and metal fibers.

Examples of the shape of the conductive auxiliary agent include a fibrous shape, an acicular shape, a tubular shape, a dumbbell shape, a disk shape, and an oval spherical shape. Among the above examples, the shape of the conductive auxiliary agent is preferably a fibrous shape from the viewpoint of an improvement in electron conductivity of the active material.

The aspect ratio of the conductive auxiliary agent is preferably 1.5 or more, and more preferably 5 or more. In a case where the aspect ratio of the conductive auxiliary agent is 1.5 or more, the electron conductivity of the electrode active material can be improved, and thus the output characteristics of the battery can be improved.

The aspect ratio of the conductive auxiliary agent is preferably 10,000 or less, more preferably 5,000 or less, and particularly preferably 1,000 or less. Furthermore, the aspect ratio of the conductive auxiliary agent is preferably 500 or less, more preferably 300 or less, and particularly preferably 100 or less. In a case where the aspect ratio of the conductive auxiliary agent is 10,000 or less, the dispersibility of the conductive auxiliary agent can be improved, and a short circuit due to the conductive auxiliary agent penetrating a formed body for an electrode can be efficiently prevented.

The aspect ratio of the conductive auxiliary agent is measured by the following method. SEM images of three optional visual fields taken at 1,000 to 3,000-fold observation magnification using a scanning electron microscope (SEM) (for example, XL30 manufactured by Koninklijke Philips N.V) are converted to bitmap (BMP) files. Images of 50 particles of the conductive auxiliary agent are imported using image analysis software (for example, "A-ZOKUN" that is an integrated application of IP-1000PC manufactured by Asahi Engineering Co., Ltd.). A maximum length and a minimum length of each of the particles of the conductive auxiliary agent are read in a state in which the particles of the conductive auxiliary agent are observed without being overlapped. The "maximum length of the conductive auxiliary agent" means the length (that is, major axis length) of a line segment having the maximum length among line segments from a certain point to another point on the outer circumference of the conductive auxiliary agent particle. The "minimum length of the conductive auxiliary agent" means the length (that is, minor axis length) of a line segment having the minimum length among line segments from a certain point to another point on the outer circumference of the conductive auxiliary agent particle, which are orthogonal to the line segment having the maximum value. An average (A) of 40 points excluding upper 5 points and lower 5 points among the maximum lengths (major axis lengths) of the 50 particles of the conductive auxiliary agent is obtained. Next, an average (B) of 40 points excluding upper 5 points and lower 5 points among the minimum lengths (minor axis lengths) of the 50 particles of the conductive auxiliary agent is obtained. The aspect ratio of the conductive auxiliary agent is calculated by dividing the average (A) by the average (B).

The minor axis length of the conductive auxiliary agent is preferably 10 µm or less, more preferably 8 µm or less, and particularly preferably 5 µm or less.

The minor axis length of the conductive auxiliary agent is preferably 1 nm or more, more preferably 3 nm or more, and particularly preferably 5 nm or more.

The minor axis length of the conductive auxiliary agent is the minimum length of each of 50 particles of the conductive auxiliary agent calculated in the method of measuring the aspect ratio of the conductive auxiliary agent.

The average minor axis length of the conductive auxiliary agent is preferably 8 µm or less, more preferably 5 µm or less, and particularly preferably 3 µm or less.

The average minor axis length of the conductive auxiliary agent is preferably 1 nm or more, more preferably 2 nm or more, and particularly preferably 3 nm or more.

The average minor axis length of the conductive auxiliary agent is an average of the minor axis lengths of the particles of the conductive auxiliary agent, excluding upper 10% (that is, upper 5 points) and lower 10% (that is, lower 5 points) of the minimum lengths (minor axis lengths) of 50 particles of the conductive auxiliary agent calculated in the method of measuring the aspect ratio of the conductive auxiliary agent.

The electrode material may contain one kind of conductive auxiliary agent alone, or two or more kinds of conductive auxiliary agents.

In a case where the electrode material contains a conductive auxiliary agent, the content of the conductive auxiliary agent is preferably more than 0 mass % and 10 mass % or less, more preferably 0.5 mass % to 8 mass %, and particularly preferably 1 mass % to 7 mass % with respect to the total solid content mass of the electrode material from the viewpoint of an improvement in electron conductivity of the active material.

(Lithium Salt)

The electrode material preferably contains a lithium salt from the viewpoint of an improvement in battery performance. The lithium salt is not limited, and known lithium salts can be used.

As the lithium salt, the lithium salts described in paragraphs 0082 to 0085 of JP2015-088486A are preferable.

The electrode material may contain one kind of lithium salt alone, or two or more kinds of lithium salts.

In a case where the electrode material contains a lithium salt, the content of the lithium salt is preferably 0.1 mass % to 10 mass % with respect to the total solid content mass of the electrode material.

(Dispersant)

The electrode material preferably contains a dispersant. In a case where the electrode material contains a dispersant, it is possible to suppress the aggregation in a case where the concentration of any one of the electrode active material or the inorganic solid electrolyte is high.

The dispersant is not limited, and known dispersants can be used. The dispersant is preferably a compound formed of low molecules of a molecular weight of 200 or more and less than 3,000 or oligomers, and having a functional group represented by the following functional group (I) and an alkyl group having 8 or more carbon atoms or an aryl group having 10 or more carbon atoms in the same molecule.

The functional group (I) is at least one functional group selected from the group consisting of an acidic group, a group having a basic nitrogen atom, a (meth)acryloyl group, a (meth)acrylamide group, an alkoxysilyl group, an epoxy group, an oxetanyl group, an isocyanate group, a cyano group, and a sulfanyl group, and a hydroxy group, preferably at least one functional group selected from the group consisting of an acidic group, a group having a basic nitrogen atom, an alkoxysilyl group, a cyano group, a sulfanyl group, and a hydroxy group, and more preferably at least one functional group selected from the group consisting of a carboxy group, a sulfonic acid group, a cyano group, an amino group, and a hydroxy group.

The electrode material may contain one kind of dispersant alone, or two or more kinds of dispersants.

In a case where the electrode material contains a dispersant, the content of the dispersant is preferably 0.2 mass % to 10 mass %, and more preferably 0.5 mass % to 5 mass % with respect to the total solid content mass of the electrode material from the viewpoint that both the prevention of aggregation and the battery performance are achieved.

(Liquid Component)

The electrode material may contain a liquid component. Examples of the liquid component include an electrolytic solution.

The electrolytic solution is not limited, and known electrolytic solutions can be used. Examples of the electrolytic solution include an electrolytic solution containing an electrolyte and a solvent. Specific examples of the electrolytic solution include an electrolytic solution containing a lithium salt compound as an electrolyte and a carbonate compound as a solvent.

Examples of the lithium salt compound include lithium hexafluorophosphate. The electrolytic solution may contain one kind of lithium salt compound alone, or two or more kinds of lithium salt compounds.

Examples of the carbonate compound include ethyl methyl carbonate, ethylene carbonate, and propylene carbonate. The electrolytic solution may contain one kind of carbonate compound alone, or two or more kinds of carbonate compounds.

Examples of the electrolyte contained in the electrolytic solution include the materials described in the above section "Inorganic Solid Electrolyte".

As a component of the electrolytic solution, for example, an ionic liquid may be used. The ionic liquid may be used as an electrolyte or a solvent.

The content of the electrolytic solution in the electrode material is preferably 30 mass % or less, more preferably 20 mass % or less, and particularly preferably 15 mass % or less with respect to the total mass of the electrode material. In a case where the content of the electrolytic solution in the electrode material is 30 mass % or less, it is possible to suppress the oozing of the electrolytic solution during the forming of the electrode material.

The content of the electrolytic solution in the electrode material is preferably 0.01 mass % or more, and more preferably 0.1 mass % or more with respect to the total mass of the electrode material from the viewpoint of an improvement in battery performance.

The electrode material may contain, as a liquid component, a solvent other than the solvent contained as a component of the electrolytic solution (hereinafter, also simply referred to as "solvent"). Examples of the solvent include alcohol compound solvents, ether compound solvents, amide compound solvents, amino compound solvents, ketone compound solvents, aromatic compound solvents, aliphatic compound solvents, and nitrile compound solvents.

Examples of the alcohol compound solvents include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of the ether compound solvents include alkylene glycol alkyl ether (for example, ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, dipropylene glycol monomethyl ether, tripropylene glycol monomethyl ether, diethylene glycol monobutyl ether, and tridiethylene glycol monobutyl ether), dimethyl ether, diethyl ether, diisopropyl ether, dibutyl ether, tetrahydrofuran, and dioxane.

Examples of the amide compound solvents include N,N-dimethylformamide, 1-methyl-2-pyrrolidone, 2-pyrrolidinone, 1,3-dimethyl-2-imidazolidinone, F-caprolactam, formamide, N-methylformamide, acetamide, N-methylacetamide, N,N-dimethylacetamide, N-methylpropanamide, and hexamethylphosphoric triamide.

Examples of the amino compound solvents include triethylamine, diisopropylethylamine, and tributylamine.

Examples of the ketone compound solvents include acetone, methyl ethyl ketone, methyl isobutyl ketone, and cyclohexanone.

Examples of the aromatic compound solvents include benzene, toluene, and xylene.

Examples of the aliphatic compound solvents include hexane, heptane, octane, and decane.

Examples of the nitrile compound solvents include acetonitrile, propionitrile, and isobutyronitrile.

The solvent is preferably at least one solvent selected from the group consisting of a nitrile compound solvent, an aromatic compound solvent, and an aliphatic compound solvent, more preferably at least one solvent selected from the group consisting of isobutyronitrile, toluene, and heptane, and particularly preferably at least one solvent selected from the group consisting of toluene and heptane.

The boiling point of the solvent is preferably 50° C. or higher, and more preferably 70° C. or higher at normal pressure (that is, 1 atm). The boiling point of the solvent is preferably 250° C. or lower, and more preferably 220° C. or lower at normal pressure (that is, 1 atm).

The electrode material may contain one kind of solvent alone, or two or more kinds of solvents.

The content of the solvent (including the solvent contained as a component of the electrolytic solution, and this is the same in this paragraph) in the electrode material is preferably 30 mass % or less, more preferably 20 mass % or less, and particularly preferably 15 mass % or less with respect to the total mass of the electrode material. In a case where the content of the solvent in the electrode material is 30 mass % or less, it is possible to suppress the deterioration of battery performance, and it is possible to suppress the oozing of the solvent during the forming of the electrode material. The lower limit of the content of the solvent in the electrode material is not limited. The content of the solvent in the electrode material may be determined in a range of 0 mass % or more. The content of the solvent in the electrode material may be 0 mass %, or may exceed 0 mass %.

The content of the liquid component in the electrode material is preferably 30 mass % or less, more preferably 20 mass % or less, and particularly preferably 15 mass % or less with respect to the total mass of the electrode material. In a case where the content of the liquid component in the electrode material is 30 mass % or less, it is possible to suppress the oozing of the liquid component during the forming of the electrode material. In addition, in a case where the liquid component contains a solvent, it is possible to suppress the deterioration of battery performance. The lower limit of the content of the liquid component in the electrode material is not limited. The content of the liquid component in the electrode material may be determined in a range of 0 mass % or more. The content of the liquid component in the electrode material may be 0 mass %, or may exceed 0 mass %.

As the electrode material, for example, the following materials can also be used in addition to the above materials.
(1) The granulated body described in paragraphs 0029 to 0037 of JP2017-104784A
(2) The positive electrode mixture paint described in paragraph 0054 of JP2016-059870A
(3) The composite particles described in paragraphs 0017 to 0070 of JP2016-027573A
(4) The composite particles described in paragraphs 0020 to 0033 of JP6402200B
(5) The electrode composition described in paragraphs 0040 to 0065 of JP2019-046765A
(6) The materials (for example, active material, positive electrode slurry, and negative electrode slurry) described in paragraphs 0080 to 0114 of JP2017-054703A
(7) The powder described in JP2014-198293A
(8) The active material, binder, and composite particles described in paragraphs 0024 to 0025, 0028, and 0030 to 0032 of JP2016-062654A (Shape)

The shape of the electrode material is not limited. The electrode material is preferably a particulate electrode material (that is, powder) from the viewpoint of battery performance.

(Electrode Material Preparation Method)

The electrode material can be prepared by, for example, mixing the electrode active material with the above-described optional components other than the electrode active material.

Examples of the mixing method include a method using a ball mill, a beads mill, a planetary mixer, a blade mixer, a roll mill, a kneader, or a disk mill.

«Supply Step»

The method of manufacturing a formed body for an electrode according to the present disclosure includes a step of supplying the electrode material onto the support (supply step).

[Support]

The support is not limited, and known supports can be used.

The coefficient of linear expansion of the support is preferably $20 \times 10^{-6}$/° C. or more, more preferably $30 \times 10^{-6}$/°

C. or more, and particularly preferably $50 \times 10^{-6}/°$ C. or more. In a case where the coefficient of linear expansion of the support is $20 \times 10^{-6}/°$ C. or more, the adhesiveness between the electrode material and the support can be further improved. The coefficient of linear expansion of the support is preferably $180 \times 10^{-6}/°$ C. or less, more preferably $150 \times 10^{-6}/°$ C. or less, and particularly preferably $120 \times 10^{-6}/°$ C. or less. In a case where the coefficient of linear expansion of the support is $180 \times 10^{-6}/°$ C. or less, the deformation of the support due to heating can be suppressed.

The coefficient of linear expansion is measured by thermomechanical analysis (TMA). A thermomechanical analyzer (for example, TMA8310L manufactured by Rigaku Corporation) is used as a device for measurement. Specific measurement conditions are shown below. In a case where a sample having the following dimensions cannot be prepared or the following sample dimensions exceed the permissible range of the thermomechanical analyzer, a sample having dimensions as close as possible to the following dimensions is prepared within a range of measurable sample dimensions.

(1) Measurement Mode: Tension
(2) Rate of Temperature Increase: 5° C./min
(3) Temperature Range: from 20° C. to 200° C.
(4) Load: 98 mN (constant load)
(5) Atmosphere: Nitrogen
(6) Sample Dimensions: Length 5 mm×Width 25 mm×Thickness 1 mm Examples of the material of the support include metals and resins.

Examples of the metals include aluminum and stainless steel. As the support containing a metal, metal foil is preferable.

Examples of the resins include polyethylene terephthalate, polyethylene, polypropylene, and polyethylene naphthalate. As the support containing a resin, a resin film is preferable.

The support may be paper. Examples of the paper include release paper.

The support may be a collector. The collector is not limited, and known collectors can be used. In a case where the support is a collector, the electrode material can be easily placed on the collector, and moreover, productivity can also be improved.

Examples of the positive electrode collector include aluminum, aluminum alloys, stainless steel, nickel, and titanium. The positive electrode collector is preferably aluminum or an aluminum alloy. The positive electrode collector is also preferably aluminum or stainless steel having a surface with a coating layer containing carbon, nickel, titanium, or silver.

Examples of the negative electrode collector include aluminum, copper, copper alloys, stainless steel, nickel, and titanium. The negative electrode collector is preferably aluminum, copper, a copper alloy, or stainless steel, and more preferably copper or a copper alloy. The negative electrode collector is also preferably aluminum, copper, a copper alloy, or stainless steel having a surface with a coating layer containing carbon, nickel, titanium, or silver.

As the collector, aluminum foil or copper foil is preferable. Aluminum foil is usually used as a collector at the positive electrode. Copper foil is usually used as a collector at the negative electrode.

The support may be surface-treated. Examples of the surface treatment include silicone coating and fluorine coating.

The shape of the support is not limited. The shape of the support is preferably a flat plate shape.

The thickness of the support is not limited. The average thickness of the support is preferably 5 μm or more, more preferably 10 μm or more, and particularly preferably 20 μm or more from the viewpoint of an increase in area. The average thickness of the support is preferably 500 μm or less, more preferably 300 μm or less, and particularly preferably 200 μm or less from the viewpoint of flexibility and lightweight property. The average thickness of the support is an arithmetic average of the thicknesses measured at three points by cross-section observation. In the cross-section observation, known microscopes (for example, a scanning electron microscope) can be used.

[Supply Method]

The method of supplying the electrode material is not limited, and known methods can be used. Examples of the method of supplying the electrode material include a method using a supply device.

Examples of the supply device include a screw feeder, a disk feeder, a rotary feeder, and a belt feeder. The inside of the supply device may be surface-treated. Examples of the surface treatment include silicone coating and fluorine coating.

Examples of the method of supplying the electrode material also include a method of supplying the electrode material onto the support by jetting the electrode material from an outlet. In the method of jetting the electrode material from the outlet, a supply device having an outlet may be used. In a case where a supply device having an outlet is used, the electrode material can be jetted from the outlet of the supply device. The outlet may be surface-treated. Examples of the surface treatment include silicone coating and fluorine coating.

The outlet preferably has an on-off mechanism controlling the supply of the electrode material from the viewpoint of preventing contamination due to the scattering of the electrode material. Here, the "on-off mechanism" means a movable mechanism capable of opening and closing a flow passage of the electrode material. Examples of the valve body used for the on-off mechanism include a plate-shaped valve body and a spherical valve body.

In a case where the electrode material is supplied using a supply device, the on-off mechanism is also preferably placed in a flow passage of the electrode material from the supply device to the outlet.

In the supply step, the electrode material is preferably supplied onto the support while the outlet and the support are relatively moved. By supplying the electrode material by the above method, the dispersibility of the electrode material can be improved, and thus it is possible to obtain a formed body for an electrode that is excellent in uniformity of a mass distribution.

In the present disclosure, "relatively moving the outlet and the support" includes moving the outlet with respect to the support, moving the support with respect to the outlet, and respectively moving the outlet and the support. In a case where the outlet and the support are respectively moved, the outlet and the support may be respectively moved in, for example, directions away from each other along the same direction axis. In addition, in a case where the outlet and the support are respectively moved, the outlet and the support may be moved in directions orthogonal to each other. For example, moving the outlet in a width direction (for example, TD: Transverse Direction) of the support and moving the support in a direction (for example, MD: Machine Direction) orthogonal to the width direction of the support can be combined.

In the supply step, the support is preferably moved with respect to the outlet from the viewpoint of an improvement in productivity.

The transport unit for the support is not limited, and known transport units can be used. Examples of the transport unit for the support include a belt conveyor, a linear motion guide, and a cross roller table.

From the viewpoint of stability, the supply of the electrode material is preferably 0.01 kg/min to 100 kg/min, more preferably 0.1 kg/min to 10 kg/min, and particularly preferably 0.5 kg/min to 5 kg/min.

The supply of the electrode material onto the support is preferably 10 mg/cm² to 1,000 mg/cm², more preferably 30 mg/cm² to 700 mg/cm², and particularly preferably 50 mg/cm² to 500 mg/cm² from the viewpoint of battery performance.

«First Pressurizing Step»

The method of manufacturing a formed body for an electrode according to the present disclosure includes a step of pressurizing the electrode material on the support by sandwiching the support and the electrode material between a first roll that is brought into contact with the electrode material and a second roll that is brought into contact with the support (first pressurizing step).

In the present disclosure, "brought into contact with the electrode material" is not limited to direct contact with the electrode material, and includes indirect contact with the electrode material via another member (for example, second support to be described later) placed on the surface of the electrode material opposite to the surface on which the support is placed.

In the present disclosure, "brought into contact with the support" is not limited to direct contact with the support, includes indirect contact with the support via another member placed on the surface of the support opposite to the surface on which the electrode material is placed.

[First Roll]

The first roll used in the first pressurizing step is brought into contact with the electrode material and pressurizes the electrode material. In the first pressurizing step, the first roll is preferably brought into direct contact with the electrode material.

The first roll may be provided at a position where it is brought into contact with the electrode material in the pressurization of the electrode material on the support. The first roll may be movable as long as it has a function of pressurizing the electrode material.

Examples of the material of the first roll include stainless steel and polyetheretherketone (PEEK). The first roll may be surface-treated. Examples of the surface treatment include silicone coating and fluorine coating.

The diameter of the first roll is not limited. The diameter of the first roll may be determined in a range of, for example, φ50 mm to φ800 mm.

[Second Roll]

The second roll used in the first pressurizing step is brought into contact with the support and pressurizes the electrode material. In the first pressurizing step, the second roll is preferably brought into direct contact with the support.

The second roll may be provided at a position where it is brought into contact with the support in the pressurization of the electrode material on the support. The second roll may be movable as long as it has a function of pressurizing the electrode material. The second roll is usually placed to face the main surface of the first roll. The first roll and the second roll preferably constitute a pair of press rolls.

Examples of the material of the second roll include stainless steel and polyetheretherketone (PEEK). The material of the second roll may be the same as or different from that of the first roll. The second roll may be surface-treated. Examples of the surface treatment include silicone coating and fluorine coating. The surface treatment performed on the second roll may be the same as or different from that performed on the first roll.

The diameter of the second roll is not limited. The diameter of the second roll may be determined in a range of, for example, φ50 mm to φ800 mm. The diameter of the second roll may be the same as or different from that of the first roll.

[Temperature]

In the first pressurizing step, a temperature T1 of the first roll (hereinafter, may be simply referred to as "temperature Ti") and a temperature T2 of the second roll (hereinafter, may be simply referred to as "temperature T2") satisfy a relationship T1>T2. In a case where the temperature T1 of the first roll and the temperature T2 of the second roll satisfy a relationship T1>T2, a formed body for an electrode that is excellent in uniformity of a mass distribution and in adhesiveness between the electrode material and the support can be manufactured.

In the present disclosure, the "roll temperature" means a set temperature of the roll adjusted by a temperature adjustment unit. However, in a case where the temperature of the roll is not adjusted by a temperature adjustment unit, the "roll temperature" means a surface temperature of the roll.

The larger the difference between the temperature T1 and the temperature T2, the better from the viewpoint of suppression of the deformation of the support. The absolute value of the difference between the temperature T1 and the temperature T2 is preferably 10° C. or higher, more preferably 20° C. or higher, even more preferably 30° C. or higher, and particularly preferably 40° C. or higher. The upper limit of the absolute value of the difference between the temperature T1 and the temperature T2 is not limited. The absolute value of the difference between the temperature T1 and the temperature T2 may be determined in a range of, for example, 220° C. or lower.

The temperature T1 is preferably 30° C. or higher, more preferably 40° C. or higher, and particularly preferably 50° C. or higher. In a case where the temperature T1 is 30° C. or higher, the adhesiveness between the electrode material and the support can be further improved, and the formability of the electrode material can also be improved. The temperature T1 is preferably 70° C. or lower, more preferably 65° C. or lower, and particularly preferably 60° C. or lower. In a case where the temperature T1 is 70° C. or lower, a formed body for an electrode that is excellent in uniformity of a mass distribution can be manufactured.

The temperature T2 is preferably 30° C. or lower, more preferably 25° C. or lower, and particularly preferably 20° C. or lower. In a case where the temperature T2 is 30° C. or lower, the deformation of the support can be suppressed, and thus a formed body for an electrode that is excellent in uniformity of a mass distribution can be manufactured. The lower limit of the temperature T2 is not limited. The temperature T2 may be determined in a range of, for example, 0° C. or higher (preferably 10° C. or higher, and more preferably 15° C. or higher).

[Pressure]

A pressure P1 in the first pressurizing step is preferably 5 MPa or more, and more preferably 10 MPa or more. The pressure P1 is preferably 1 GPa or less, more preferably 500 MPa or less, and particularly preferably 300 MPa or less. In a case where the pressure P1 is in the above range, a formed body for an electrode that is excellent in uniformity of a mass distribution and in adhesiveness between the electrode material and the support can be manufactured. The method of measuring the pressure P1 will be described below. First, a pressure measurement film (for example, PRESCALE manufactured by FUJIFILM Corporation) is sandwiched between the first roll and the second roll, and while 1 m of the pressure measurement film is passed between the first roll and the second roll, the pressure measurement film is pressurized under the same conditions as those (for example, pressure setting, temperature setting, and speed setting) in the first pressurizing step. Next, a quadrangular test piece having a length of 30 cm in a length direction of the pressure measurement film (that is, the transport direction of the pressure measurement film) is collected from a part pressurized under stable conditions in the pressure measurement film. In other words, the test piece is collected from the pressure measurement film excluding a part where the measurement is not stably performed due to fluctuations in conditions (for example, increase or decrease of the roll rotation speed). The width of the test piece is at least 30 cm. Next, the pressure is measured at a total of 25 intersections where five straight lines that are parallel to a length direction of the test piece (that is, the transport direction of the pressure measurement film) and divide the test piece into five equal parts and five straight lines that are parallel to a width direction of the test piece (that is, the direction orthogonal to the transport direction of the pressure measurement film) and divide the test piece into five equal parts intersect. For example, with PRESCALE manufactured by FUJIFILM Corporation, the pressure can be measured based on the color optical density obtained according to the magnitude of the pressure. An arithmetic average of the measured values at a total of 25 intersections is defined as the pressure P1.

«Second Pressurizing Step»

The method of manufacturing a formed body for an electrode according to the present disclosure preferably includes a step of pressurizing the electrode material on the support by sandwiching the support and the electrode material between a third roll that is brought into contact with the electrode material and a fourth roll that is brought into contact with the support (hereinafter, may be referred to as "second pressurizing step") after the first pressurizing step. In a case where the method of manufacturing a formed body for an electrode according to the present disclosure includes the second pressurizing step, a formed body for an electrode that is excellent in uniformity of a mass distribution can be manufactured.

[Third Roll]

The third roll is brought into contact with the electrode material and pressurizes the electrode material. In the second pressurizing step, the third roll is preferably brought into direct contact with the electrode material.

The third roll may be provided at a position where it is brought into contact with the electrode material in the pressurization of the electrode material on the support. The third roll may be movable as long as it has a function of pressurizing the electrode material.

Examples of the material of the third roll include the materials described in the above section "First Roll". The third roll may be surface-treated. Examples of the surface treatment include silicone coating and fluorine coating.

Examples of the diameter of the third roll include the diameters described in the above section "First Roll". The diameter of the third roll is preferably larger than that of the first roll from the viewpoint of suppression of pressure non-uniformity in which the uniformity of a pressure is impaired due to the roll bending during pressurization.

[Fourth Roll]

The fourth roll is brought into contact with the support and pressurizes the electrode material. In the second pressurizing step, the fourth roll is preferably brought into direct contact with the support.

The fourth roll may be provided at a position where it is brought into contact with the support in the pressurization of the electrode material on the support. The fourth roll may be movable as long as it has a function of pressurizing the electrode material. The fourth roll is usually placed to face the main surface of the third roll. The third roll and the fourth roll preferably constitute a pair of press rolls.

Examples of the material of the fourth roll include the materials described in the above section "Second Roll". The material of the fourth roll may be the same as or different from that of the third roll. The fourth roll may be surface-treated. Examples of the surface treatment include silicone coating and fluorine coating. The surface treatment performed on the fourth roll may be the same as or different from that performed on the third roll.

Examples of the diameter of the fourth roll include the diameters described in the above section "Second Roll". The diameter of the fourth roll may be the same as or different from that of the third roll. The diameter of the fourth roll is preferably larger than that of the second roll from the viewpoint of suppression of pressure non-uniformity in which the uniformity of a pressure is impaired due to the roll bending during pressurization.

[Temperature]

A temperature $T3$ of the third roll (hereinafter, may be simply referred to as "temperature $T3$") and a temperature $T4$ of the fourth roll (hereinafter, may be simply referred to as "temperature $T4$") preferably satisfy a relationship $T3>T4$. In a case where the temperature $T3$ of the third roll and the temperature $T4$ of the fourth roll satisfy a relationship $T3>T4$, a formed body for an electrode that is excellent in uniformity of a mass distribution and in adhesiveness between the electrode material and the support can be manufactured.

The larger the difference between the temperature $T3$ and the temperature $T4$, the better from the viewpoint of suppression of the deformation of the support. The absolute value of the difference between the temperature $T3$ and the temperature $T4$ is preferably 30° C. or higher, more preferably 50° C. or higher, even more preferably 70° C. or higher, and particularly preferably 80° C. or higher. The upper limit of the absolute value of the difference between the temperature $T3$ and the temperature $T4$ is not limited. The absolute value of the difference between the temperature $T3$ and the temperature $T4$ may be determined in a range of, for example, 220° C. or lower.

The temperature $T3$ is preferably 70° C. or higher, more preferably 85° C. or higher, and particularly preferably 90° C. or higher. In a case where the temperature $T3$ is 70° C. or higher, the adhesiveness between the electrode material and the support can be further improved, and the formability of the electrode material can also be improved. The temperature $T3$ is preferably 130° C. or lower, and more preferably 110° C. or lower. In a case where the temperature T3 is 130° C. or lower, a formed body for an electrode that is excellent in uniformity of a mass distribution can be manufactured.

The temperature T4 is preferably 30° C. or lower, more preferably 25° C. or lower, and particularly preferably 20° C. or lower. In a case where the temperature T4 is 30° C. or lower, the deformation of the support can be suppressed, and thus a formed body for an electrode that is excellent in uniformity of a mass distribution can be manufactured. The lower limit of the temperature T4 is not limited. The temperature T4 may be determined in a range of, for example, 0° C. or higher (preferably 10° C. or higher, and more preferably 15° C. or higher).

In a case where the method of manufacturing a formed body for an electrode according to the present disclosure includes the second pressurizing step, the temperature T1 and the temperature T3 preferably satisfy a relationship T1<T3. In a case where the temperature T1 and the temperature T3 satisfy the relationship T1<T3, a formed body for an electrode that is excellent in uniformity of a mass distribution can be manufactured. In a case where the temperature T1 and the temperature T3 satisfy the relationship T1<T3, the absolute value of the difference between the temperature T1 and the temperature T3 is preferably 10° C. or higher, more preferably 20° C. or higher, even more preferably 30° C. or higher, and particularly preferably 40° C. or higher. The upper limit of the absolute value of the difference between the temperature T1 and the temperature T3 is not limited. The absolute value of the difference between the temperature T1 and the temperature T3 may be determined in a range of, for example, 200° C. or lower.

In a case where the method of manufacturing a formed body for an electrode according to the present disclosure includes the second pressurizing step, the temperature T2 and the temperature T4 may be the same or different.

[Pressure]

A pressure P2 in the second pressurizing step is preferably 20 MPa or more, more preferably 50 MPa or more, and particularly preferably 100 MPa or more. The pressure P2 in the second pressurizing step is preferably 1 GPa or less, more preferably 500 MPa or less, and particularly preferably 300 MPa or less. In a case where the pressure P2 in the second pressurizing step is in the above range, a formed body for an electrode that is excellent in uniformity of a mass distribution and in adhesiveness between the electrode material and the support can be manufactured. The pressure P2 is measured by a known pressure measurement film (for example, PRESCALE manufactured by FUJIFILM Corporation). Specifically, the pressure P2 is measured by a method equivalent to the method of measuring the pressure P1.

In a case where the method of manufacturing a formed body for an electrode according to the present disclosure includes the second pressurizing step, the pressure P2 in the second pressurizing step is preferably larger than the pressure P1 in the first pressurizing step. That is, the pressure P1 and the pressure P2 preferably satisfy a relationship P1<P2. In a case where the pressure P1 and the pressure P2 satisfy the relationship P1<P2, a formed body for an electrode that is excellent in uniformity of a mass distribution and in adhesiveness between the electrode material and the support can be manufactured. From the same viewpoint, the ratio of the pressure P2 to the pressure P1 (that is, P2/P1) is preferably 2 or more, more preferably 5 or more, and particularly preferably 10 or more. The upper limit of P2/P1 is not limited. P2/P1 may be determined in a range of, for example, 25 or less.

The method of manufacturing a formed body for an electrode according to the present disclosure may include a plurality of second pressurizing steps. In a case where the method of manufacturing a formed body for an electrode according to the present disclosure includes a plurality of second pressurizing steps, for example, the plurality of second pressurizing steps may be sequentially performed after the first pressurizing step.

In a case where the method of manufacturing a formed body for an electrode according to the present disclosure includes a plurality of second pressurizing steps, a temperature $T_n3$ of the third roll in the n-th second pressurizing step and a temperature $T_{n+1}3$ of the third roll in the n+1-th second pressurizing step preferably satisfy a relationship $T_n3<T_{n+1}3$. n represents an integer of 1 or more. In a case where the temperature $T_n3$ and the temperature $T_{n+1}3$ satisfy the relationship $T_n3<T_{n+1}3$, a formed body for an electrode that is excellent in uniformity of a mass distribution can be manufactured.

In a case where the method of manufacturing a formed body for an electrode according to the present disclosure includes a plurality of second pressurizing steps, a pressure $P_{n+1}2$ in the n+1-th second pressurizing step is preferably larger than a pressure $P_n2$ in the n-th second pressurizing step. That is, the pressure $P_n2$ and the pressure $P_{n+1}2$ preferably satisfy a relationship $P_n2<P_{n+1}2$. n represents an integer of 1 or more. In a case where the pressure $P_{n+1}2$ is larger than the pressure $P_n2$, a formed body for an electrode that is excellent in uniformity of a mass distribution and in adhesiveness between the electrode material and the support can be manufactured.

«Other Steps»

The method of manufacturing a formed body for an electrode according to the present disclosure may include steps other than the above steps (hereinafter, referred to as "other steps"). Hereinafter, other steps will be described.

[Third Pressurizing Step]

The method of manufacturing a formed body for an electrode according to the present disclosure may include a step of pressurizing the electrode material on the support (hereinafter, may be referred to as "third pressurizing step") other than the first pressurizing step and the second pressurizing step as long as the gist of the present disclosure is not deviated.

The time at which the third pressurizing step is performed is not limited. The third pressurizing step may be performed between the supply step and the first pressurizing step. The third pressurizing step may be performed between the first pressurizing step and the second pressurizing step. The third pressurizing step may be performed after the second pressurizing step.

The method of pressurizing the electrode material is not limited, and known methods can be used. Examples of the method of pressurizing the electrode material include a method using a pressurizing member. For example, the electrode material on the support can be pressurized by bringing the pressurizing member into contact with the electrode material.

Examples of the pressurizing member include rolls, belts, and presses. The pressurizing member may be surface-treated. Examples of the surface treatment include silicone coating and fluorine coating.

The pressurizing member may be used alone, or two or more pressurizing members may be used in combination. In the third pressurizing step, for example, a pair of rolls may be used, a roll and a belt may be used in combination, or two belts may be used. For example, in a case where the electrode material is pressurized using a pair of rolls, the electrode material can be pressed by sandwiching the support and the electrode material between the rolls.

The temperature of the pressurizing member may be adjusted by, for example, a temperature adjustment unit. In a case where the third pressurizing step is performed between the supply step and the first pressurizing step, the temperature of the pressurizing member that is brought into contact with the electrode material is preferably lower than the temperature T1 of the first roll used in the first pressurizing step. In a case where the third pressurizing step is performed between the first pressurizing step and the second pressurizing step, the temperature of the pressurizing member that is brought into contact with the electrode material is preferably equal to or higher than the temperature T1 of the first roll used in the first pressurizing step and lower than the temperature T3 of the third roll used in the second pressurizing step. In a case where the third pressurizing step is performed after the second pressurizing step, the temperature of the pressurizing member that is brought into contact with the electrode material is preferably equal to or higher than the temperature T3 of the third roll used in the second pressurizing step. The temperature of the pressurizing member that is brought into contact with the electrode material may be determined in a range of, for example, 0° C. to 100° C.

In the third pressurizing step, a pressurizing member that is brought into contact with the support may be used in addition to the pressurizing member that is brought into contact with the electrode material. The temperature of the pressurizing member that is brought into contact with the support is preferably lower than that of the pressurizing member that is brought into contact with the electrode material. The temperature of the pressurizing member that is brought into contact with the support may be determined in a range of, for example, 0° C. to 30° C.

The pressure in the third pressurizing step is not limited. The pressure may be determined in a range of, for example, 5 MPa to 1 GPa.

[Leveling Step]

The method of manufacturing a formed body for an electrode according to the present disclosure may include a step of leveling the electrode material on the support (hereinafter, may be referred to as "leveling step") between the supply step and the first pressurizing step. In a case where the method of manufacturing a formed body for an electrode according to the present disclosure includes the leveling step, a formed body for an electrode that is excellent in uniformity of a mass distribution can be manufactured. In the present disclosure, "leveling the electrode material" means reducing the unevenness of the surface of the electrode material, and is not limited to flattening the surface of the electrode material.

The method of leveling the electrode material on the support is not limited, and known methods can be used. Examples of the method of leveling the electrode material include a method using a leveling member. For example, the electrode material can be leveled by bringing the leveling member into contact with the electrode material.

Examples of the leveling member include a roll, a press, a scraper, and a plate-shaped member (for example, squeegee). Among the above examples, the leveling member is preferably a roll from the viewpoint of continuity. The leveling member may be surface-treated. Examples of the surface treatment include silicone coating and fluorine coating.

The temperature of the leveling member is preferably lower than the temperature T1 of the first roll used in the first pressurizing step. Specifically, the temperature of the leveling member is preferably lower than 60° C., more preferably 30° C. or lower, and even more preferably 25° C. or lower. The lower limit of the temperature of the leveling member is not limited. The temperature of the leveling member may be, for example, 5° C. or higher, 10° C. or higher, or 15° C. or higher. In a case where the leveling member has a temperature adjustment unit, the temperature of the leveling member refers to a set temperature of the leveling member adjusted by the temperature adjustment unit. In a case where the leveling member has no temperature adjustment unit, the temperature of the leveling member refers to a surface temperature of the leveling member.

In the leveling step, the electrode material and the leveling member may be relatively moved. For example, the electrode material on the support can be leveled while the electrode material and the leveling member are relatively moved. In the present disclosure, "relatively moving the electrode material and the leveling member" includes moving the leveling member with respect to the electrode material, moving the electrode material with respect to the leveling member, and respectively moving the electrode material and the leveling member. In a case where the electrode material and the leveling member are respectively moved, the electrode material and the leveling member are preferably respectively moved in directions away from each other along the same direction axis.

[Coating Step]

The method of manufacturing a formed body for an electrode according to the present disclosure may include a step of placing another support (hereinafter, referred to as "second support" in this section) on the opposite surface to the surface of the electrode material on which the support (referred to as the support described in the above section "Support") is placed (hereinafter, may be referred to as "coating step"). In a case where the method of manufacturing a formed body for an electrode according to the present disclosure includes the coating step, the support described in the above section "Support" is referred to as "first support".

The time at which the coating step is performed is not limited. For example, the coating step may be performed simultaneously with the supply step or after the supply step. The coating step may be performed between the supply step and the first pressurizing step. The coating step may be performed simultaneously with the first pressurizing step. In addition, for example, in a case where the method of manufacturing a formed body for an electrode according to the present disclosure includes the second pressurizing step, the coating step may be performed between the first pressurizing step and the second pressurizing step. The coating step may be performed simultaneously with the second pressurizing step or after the second pressurizing step.

Examples of the second support include the support described in the above section "Support". In a case where the first support is a member other than a collector, the second support is preferably a collector.

The shape of the second support is not limited. The shape of the second support is preferably a flat plate shape.

The thickness of the second support is not limited. The average thickness of the second support is preferably 1 μm to 500 μm, more preferably 3 μm to 300 μm, and particularly preferably 5 μm to 200 μm from the viewpoint of self-supporting property, transportability, and penetration resistance. The average thickness of the second support is an arithmetic average of the thicknesses measured at three points by cross-section observation. In the cross-section observation, known microscopes (for example, a scanning electron microscope) can be used.

[Transfer Step]

The method of manufacturing a formed body for an electrode according to the present disclosure may include a step of transferring the electrode material onto another support (hereinafter, may be referred to as "second support" in this section) (hereinafter, may be referred to as "transfer step") after the pressurizing step. In the present disclosure, "transferring the electrode material onto another support" means placing the electrode material on another support. In a case where the method of manufacturing a formed body for an electrode according to the present disclosure includes the transfer step, the support described in the above section "Support" is referred to as "first support".

In the transfer step, the electrode material can be transferred onto the second support by, for example, bringing the electrode material into contact with the second support while inverting the positional relationship between the first support and the electrode material upside down. In a case where the method of manufacturing a formed body for an electrode according to the present disclosure includes the coating step, for example, the electrode material can be transferred onto the second support by inverting the positional relationship among the first support, the electrode material, and the second support upside down.

Another support (second support) used in the transfer step is synonymous with the second support described in the above section "Coating Step", and preferable aspects are also the same.

Next, the method of manufacturing a formed body for an electrode according to the present disclosure will be described with reference to the drawings. FIG. 1 is a schematic diagram showing an example of the method of manufacturing a formed body for an electrode according to the present disclosure.

In FIG. 1, an outlet 30 is placed above a support 20. The outlet 30 is connected to a supply device (not shown) and can jet an electrode material 10.

In FIG. 1, a leveling roll 80, a pair of press rolls including a first roll 40 and a second roll 50, and a pair of press rolls including a third roll 60 and a fourth roll 70 are placed along a transport direction (arrow direction).

The first roll 40 is provided at a position where it can be brought into contact with the electrode material 10 and can press the electrode material 10 between the leveling roll 80 and the third roll 60 in the transport direction (arrow direction).

The second roll 50 is placed to face the first roll 40 in the transport direction (arrow direction). It can be brought into contact with the support 20 and can press the support 20.

The third roll 60 is provided at a position where it can be brought into contact with the electrode material 10 and can press the electrode material 10 on the downstream side of the first roll 40 in the transport direction (arrow direction).

The fourth roll 70 is placed to face the third roll 60 in the transport direction (arrow direction). It can be brought into contact with the support 20 and can press the support 20.

The leveling roll 80 as an example of the leveling member is provided at a position where it can be brought into contact with the electrode material 10 and can level the electrode material 10 between the outlet 30 and the first roll 40 in the transport direction (arrow direction).

For example, as shown in FIG. 1, the electrode material 10 is jetted from the outlet 30 to supply the electrode material 10 onto the support 20 in the supply step. The electrode material 10 supplied onto the support 20 is transported together with the support 20 in the transport direction (arrow direction).

For example, as shown in FIG. 1, while the support 20 and the electrode material 10 are transported in the transport direction (arrow direction), the electrode material 10 is brought into contact with the leveling roll 80 to level the electrode material 10 in the leveling step.

For example, as shown in FIG. 1, while being transported in the transport direction (arrow direction), the support 20 and the electrode material 10 are sandwiched between the first roll 40 and the second roll 50 to pressurize the electrode material 10 on the support 20 in the first pressurizing step. In the first pressurizing step, the temperature T1 of the first roll 40 and the temperature T2 of the second roll 50 satisfy the relationship T1>T2.

For example, as shown in FIG. 1, while being transported in the transport direction (arrow direction), the support 20 and the electrode material 10 are sandwiched between the third roll 60 and the fourth roll 70 to pressurize the electrode material 10 on the support 20 in the second pressurizing step. In the second pressurizing step, the temperature T3 of the third roll 60 and the temperature T4 of the fourth roll 70 satisfy the relationship T3>T4.

«Formed Body for Electrode»

A formed body for an electrode obtained by the method of manufacturing a formed body for an electrode according to the present disclosure is a formed product of the electrode material. A formed body for an electrode obtained by the method of manufacturing a formed body for an electrode according to the present disclosure is excellent in uniformity of a mass distribution and in adhesiveness between the electrode material and the support, and can thus be used as various electrodes. The formed body for an electrode is preferably a formed body for an electrode for an all-solid state secondary battery.

The shape of the formed body for an electrode is not limited, and may be determined, for example, depending on the intended use. The shape of the formed body for an electrode is preferably a flat plate shape.

The average thickness of the formed body for an electrode is preferably 0.01 mm to 2 mm, more preferably 0.05 mm to 1.5 mm, and particularly preferably 0.1 mm to 1 mm from the viewpoint of an improvement in battery performance (for example, discharge capacity and output characteristics). The average thickness of the formed body for an electrode is an arithmetic average of the thicknesses measured at three points by cross-section observation.

In the cross-section observation, known microscopes (for example, a scanning electron microscope) can be used.

EXAMPLES

Hereinafter, the present disclosure will be described in detail with examples, but is not limited thereto.

Example 1

[Preparation of Sulfide-Based Inorganic Solid Electrolyte (Li—P—S-Based Glass)]

A sulfide-based inorganic solid electrolyte was prepared with reference to "T. Ohtomo, A. Hayashi, M. Tatsumisago, Y Tsuchida, S. Hama, K. Kawamoto, Journal of Power Sources, 233, (2013), pp. 231 to 235, and A. Hayashi, S. Hama, H. Morimoto, M. Tatsumisago, T. Minami, Chem. Lett., (2001), pp 872 to 873".

Specifically, in a glove box under an argon atmosphere (dew point: −70° C.), 2.42 g of lithium sulfide ($Li_2S$, manufactured by Sigma-Aldrich Inc., purity: >99.98%) and 3.9 g of diphosphorus pentasulfide ($P_2S_5$, manufactured by Sigma-Aldrich Inc., purity: >99%) were respectively weighed, and then the lithium sulfide and the diphosphorus pentasulfide were mixed for 5 minutes using an agate mortar. The molar ratio of $Li_2S$ to $P_2S_5$ ($Li_2S:P_2S_5$) was 75:25.

66 zirconia beads having a diameter of 5 mm were put in a 45 mL zirconia container (manufactured by Fritsch GmbH). Then, the entire amount of the mixture of the lithium sulfide and the diphosphorus pentasulfide was put therein, and then the container was completely sealed under an argon atmosphere. The container was mounted on a planetary ball mill P-7 (trade name) manufactured by Fritsch GmbH, and mechanical milling was performed for 20 hours at a temperature of 25° C. and a rotation speed of 510 rpm (revolutions per minute) to obtain 6.2 g of a yellow powder of a sulfide-based solid electrolyte (Li—P—S-based glass). The above steps were repeated 50 times, and 300 g of a sulfide-based solid electrolyte was obtained.

[Preparation of Electrode Material (P-1) for Positive Electrode]

180 zirconia beads having a diameter of 5 mm were put in a 45 mL zirconia container (manufactured by Fritsch GmbH), and then 3.0 g of the prepared Li—P—S-based glass was put therein. The container was mounted on a planetary ball mill P-7 manufactured by Fritsch GmbH, and mixing was performed for 2 hours at a temperature of 25° C. and a rotation speed of 300 rpm. Next, 6.8 g of LCO ($LiCoO_2$, manufactured by Nippon Chemical Industrial CO., LTD.) as an active material and Li-100 (0.2 g) manufactured by Denka Company as a conductive auxiliary agent were put in the container. Then, the container was mounted on the planetary ball mill P-7, and mixing was performed for 10 minutes at a temperature of 25° C. and a rotation speed of 100 rpm to obtain a particulate electrode material (P-1) for a positive electrode. The above steps were repeated 50 times, and a required amount of an electrode material (P-1) for a positive electrode was obtained.

[Production of Powder Sheet]

The electrode material (P-1) for a positive electrode was put into screw feeders placed at four positions in parallel. The electrode material (P-1) for a positive electrode was supplied onto a support (20 μm aluminum foil, coefficient of linear expansion: $23 \times 10^{-6}/°C$.) through a hopper from the screw feeders to the support. The hopper has four inlets and one outlet for the electrode material. An electrode material of 20 mm in the width direction was supplied from one outlet of the hopper. Next, the electrode material (20 mm in width direction×4) supplied onto the support was leveled using a leveling roll. As a first pressurizing step, the electrode material on the support was pressurized at a pressure of 10 MPa using a pair of press rolls (roll temperature on the electrode material side: 60° C., roll temperature on the support side: 20° C.). Through the above procedure, a powder sheet having a length of 10 cm or more in a longitudinal direction in which the weight of electrode material per unit area (target value) was 100 mg/cm² was obtained.

Example 2

A powder sheet was produced by the same procedure as in Example 1, except that the pressure in the first pressurizing step was 100 MPa.

Example 3

A powder sheet was produced by the same procedure as in Example 1, except that the pressure in the first pressurizing step was 200 MPa.

Example 4

A powder sheet was produced by the same procedure as in Example 1, except that after the first pressurizing step, the electrode material on the support was pressurized at a pressure of 100 MPa using a pair of press rolls (roll temperature on the electrode material side: 100° C., roll temperature on the support side: 20° C.) as a second pressurizing step.

Example 5

A powder sheet was produced by the same procedure as in Example 1, except that after the first pressurizing step, the electrode material on the support was pressurized at a pressure of 200 MPa using a pair of press rolls (roll temperature on the electrode material side: 100° C., roll temperature on the support side: 20° C.) as a second pressurizing step.

Example 6

A powder sheet was produced by the same procedure as in Example 1, except that a commercially available polyethylene terephthalate (PET) film (T60 LUMIRROR manufactured by Toray Industries, Inc., thickness: 100 μm, coefficient of linear expansion: $120 \times 10^{-6}/°C$.) was used as the support.

Example 7

A powder sheet was produced by the same procedure as in Example 1, except that commercially available release paper (SP-8E ivory manufactured by NIHON-LABEL, thickness: 100 μm, coefficient of linear expansion: $160 \times 10^{-6}/°C$.) was used as the support.

Example 8

A powder sheet was produced by the same procedure as in Example 4, except that a commercially available polyethylene terephthalate (PET) film (T60 LUMIRROR manufactured by Toray Industries, Inc., thickness: 100 μm, coefficient of linear expansion: $120 \times 10^{-6}/°C$.) was used as the support.

Example 9

A powder sheet was produced by the same procedure as in Example 4, except that commercially available release paper (SP-8E ivory manufactured by NIHON-LABEL, thickness: 100 μm, coefficient of linear expansion: 160× $10^{-6}/°$ C.) was used as the support.

Example 10

A powder sheet was produced by the same procedure as in Example 4, except that the roll temperature on the electrode material side was 70° C. in the first pressurizing step, and the roll temperature on the electrode material side and the roll temperature on the support side were 25° C. in the second pressurizing step.

Comparative Example 1

A powder sheet was produced by the same procedure as in Example 1, except that the first pressurizing step was not performed.

Comparative Example 2

A powder sheet was produced by the same procedure as in Example 1, except that the roll temperature on the support side was 60° C. in the first pressurizing step.

<Evaluation of Mass Distribution>

Test pieces having a size of 1 cm$^2$ were cut out from 80 places ([8 places in width direction]×[10 places in length direction]) in the powder sheet. A frame-shaped Thomson blade in which the area inside the frame per frame was adjusted to 1 cm$^2$ was used to cut out the test piece. The mass of each test piece cut out from a total of 80 places in the powder sheet was measured, and then a (standard deviation) was obtained from the mass of the test pieces. Based on the obtained σ, the mass distribution was evaluated according to the following criteria. Of the following criteria, A, B, and C were accepted.

(Criteria)
A: $0\% \leq \sigma < 1\%$
B: $1 \leq \sigma \leq 2\%$
C: $2\% \leq \sigma < 3\%$
D: $3\% \leq \sigma < 10\%$
E: $10\% \leq \sigma$ <Evaluation of Adhesiveness>

The surface of the electrode material of the powder sheet was directed to the ground, and the adhesiveness was evaluated according to the following criteria based on a time (t) until the electrode material fell off from the support. Of the following criteria, A, B, and C were accepted.

(Criteria)
A: 60 seconds<t
B: 30 seconds<t≤60 seconds
C: 15 seconds<t≤30 seconds
D: 10 seconds<t≤15 seconds
E: t≤10 seconds

TABLE 1

| | | | First Pressurizing Step | | | Second Pressurizing Step | | | Evaluation | |
|---|---|---|---|---|---|---|---|---|---|---|
| | Support | Electrode Material | Pressure P1 [MPa] | Roll Temperature T1 on Electrode Material Side [° C.] | Roll Temperature T2 on Support Side [° C.] | Pressure P2 [MPa] | Roll Temperature T3 on Electrode Material Side [° C.] | Roll Temperature T4 on Support Side [° C.] | Mass Distribution | Adhesiveness |
| Example 1 | aluminum foil | P-1 | 10 | 60 | 20 | — | — | — | B | C |
| Example 2 | aluminum foil | P-1 | 100 | 60 | 20 | — | — | — | B | B |
| Example 3 | aluminum foil | P-1 | 200 | 60 | 20 | — | — | — | B | B |
| Example 4 | aluminum foil | P-1 | 10 | 60 | 20 | 100 | 100 | 20 | A | B |
| Example 5 | aluminum foil | P-1 | 10 | 60 | 20 | 200 | 100 | 20 | A | B |
| Example 6 | PET film | P-1 | 10 | 60 | 20 | — | — | — | B | A |
| Example 7 | release paper | P-1 | 10 | 60 | 20 | — | — | — | B | A |
| Example 8 | PET film | P-1 | 10 | 60 | 20 | 100 | 100 | 20 | A | A |
| Example 9 | release paper | P-1 | 10 | 60 | 20 | 100 | 100 | 20 | A | A |
| Example 10 | aluminum foil | P-1 | 10 | 70 | 20 | 100 | 25 | 25 | A | C |
| Comparative Example 1 | aluminum foil | P-1 | — | — | — | — | — | — | D | E |
| Comparative Example 2 | aluminum foil | P-1 | 10 | 60 | 60 | — | — | — | C | D |

In Table 1, "Roll Temperature on Electrode Material Side" means a set temperature of the roll that is brought into contact with the electrode material. "Roll Temperature on Support Side" means a set temperature of the roll that is brought into contact with the support.

From Table 1, it has been found that Examples 1 to 10 are more excellent than Comparative Examples 1 and 2 in uniformity of a mass distribution and in adhesiveness between the electrode material and the support.

The entire disclosure of JP2019-149871 filed on Aug. 19, 2019 is incorporated herein by reference. All literatures, patent applications, and technical standards described herein are incorporated herein by reference to the same extent as if each literature, patent application, or technical standard is specifically and individually indicated as being incorporated by reference.

What is claimed is:

1. A method of manufacturing a formed body for an electrode, the method comprising:
    preparing an electrode material containing an electrode active material;
    supplying the electrode material onto a support; and
    pressurizing the electrode material on the support by sandwiching the support and the electrode material between a first roll that is brought into contact with the electrode material and a second roll that is brought into contact with the support,
    a temperature T1 of the first roll being from 50° C. to 65° C., a temperature T2 of the second roll satisfying a relationship T1>T2, and an absolute value of a difference between the temperature T1 and the temperature T2 being 30° C. or larger, and
    the support being an aluminum foil.

2. The method of manufacturing a formed body for an electrode according to claim 1, wherein a pressure P1 is 10 MPa to 1 GPa in the pressurizing the electrode material on the support by sandwiching the support and the electrode material between the first roll and the second roll.

3. The method of manufacturing a formed body for an electrode according to claim 2, further comprising:
    pressurizing the electrode material on the support by sandwiching the support and the electrode material between a third roll that is brought into contact with the electrode material and a fourth roll that is brought into contact with the support after the pressurizing the electrode material on the support by sandwiching the support and the electrode material between the first roll and the second roll.

4. The method of manufacturing a formed body for an electrode according to claim 3, wherein a temperature T3 of the third roll and a temperature T4 of the fourth roll satisfy the relationship T3>T4.

5. The method of manufacturing a formed body for an electrode according to claim 2, further comprising:
    pressurizing the electrode material on the support by sandwiching the support and the electrode material between a third roll that is brought into contact with the electrode material and a fourth roll that is brought into contact with the support after the pressurizing the electrode material on the support by sandwiching the support and the electrode material between the first roll and the second roll.

6. The method of manufacturing a formed body for an electrode according to claim 2, further comprising:
    pressurizing the electrode material on the support by sandwiching the support and the electrode material between a third roll that is brought into contact with the electrode material and a fourth roll that is brought into contact with the support after the pressurizing the electrode material on the support by sandwiching the support and the electrode material between the first roll and the second roll.

7. The method of manufacturing a formed body for an electrode according to claim 6, wherein a temperature T3 of the third roll and a temperature T4 of the fourth roll satisfy the relationship T3>T4, and an absolute value of a difference between the temperature T3 and the temperature T4 is 30° C. or higher.

8. The method of manufacturing a formed body for an electrode according to claim 6, wherein the temperature T3 is from 70° C. to 130° C.

9. The method of manufacturing a formed body for an electrode according to claim 8, wherein the temperature T4 is from 0° C. to 30° C. and the temperature T1 and the temperature T3 satisfy the relationship T1<T3.

10. The method of manufacturing a formed body for an electrode according to claim 9, wherein a pressure P2 is 20 MPa to 1 GPa in the pressurizing the electrode material on the support by sandwiching the support and the electrode material between the third roll and the fourth roll.

11. The method of manufacturing a formed body for an electrode according to claim 10, wherein a ratio of a pressure P2 in the pressurizing the electrode material on the support by sandwiching the support and the electrode material between the third roll and the fourth roll, to a pressure P1 in the pressurizing the electrode material on the support by sandwiching the support and the electrode material between the first roll and the second roll, is 2 or more.

12. The method of manufacturing a formed body for an electrode according to claim 10, wherein a coefficient of linear expansion of the support is from $20\times10^{-6}/°$ C. to $180\times10^{-6}/°$ C.

* * * * *